(12) United States Patent
Cretella, Jr. et al.

(10) Patent No.: US 9,069,339 B2
(45) Date of Patent: Jun. 30, 2015

(54) SENSOR FUSION

(71) Applicant: Apple Inc., Cupertino, CA (US)

(72) Inventors: Michael A. Cretella, Jr., San Francisco, CA (US); Venu Madhav Duggineni, Santa Clara, CA (US); Michael Man-Cheung Eng, San Jose, CA (US); Ronald Keryuan Huang, San Jose, CA (US); Christopher Moore, San Francisco, CA (US); Christopher T. Mullens, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 14/149,350

(22) Filed: Jan. 7, 2014

(65) Prior Publication Data

US 2014/0121855 A1    May 1, 2014

Related U.S. Application Data

(63) Continuation of application No. 13/620,575, filed on Sep. 14, 2012, now Pat. No. 8,624,695, which is a continuation of application No. 13/037,271, filed on Feb. 28, 2011, now Pat. No. 8,289,115.

(60) Provisional application No. 61/384,179, filed on Sep. 17, 2010, provisional application No. 61/438,220, filed on Jan. 31, 2011.

(51) Int. Cl.
| | |
|---|---|
| H01F 7/00 | (2006.01) |
| H01F 1/00 | (2006.01) |
| H01F 7/02 | (2006.01) |
| B65D 5/52 | (2006.01) |
| B65D 25/24 | (2006.01) |
| G05B 15/02 | (2006.01) |
| G06F 1/16 | (2006.01) |
| G06F 9/00 | (2006.01) |

(52) U.S. Cl.
CPC .............. *G05B 15/02* (2013.01); *Y10T 24/32* (2013.01); *G06F 1/1626* (2013.01); *G06F 1/1677* (2013.01); *G06F 2200/1633* (2013.01); *G06F 2200/1634* (2013.01); *G06F 9/00* (2013.01)

(58) Field of Classification Search
CPC ...................................... G06F 1/1622
USPC ................ 335/219, 285, 302–306, 205–207; 439/38, 218, 217, 39; 24/303; 361/807, 361/679.01, 600; 206/45.2, 45.23, 45.24, 206/305, 320, 764, 765; 345/111
See application file for complete search history.

(56) References Cited

U.S. PATENT DOCUMENTS

| | | | |
|---|---|---|---|
| 2005/0288072 A1* | 12/2005 | Kemppinen | ............... 455/575.3 |
| 2008/0158173 A1 | 7/2008 | Hamblin et al. | |
| 2010/0045628 A1 | 2/2010 | Gettemy et al. | |
| 2011/0095976 A1* | 4/2011 | Hwang et al. | ................. 345/156 |

FOREIGN PATENT DOCUMENTS

JP    2009199301    9/2009

\* cited by examiner

*Primary Examiner* — Mohamad Musleh
(74) *Attorney, Agent, or Firm* — Downey Brand LLP

(57) ABSTRACT

Accurate and reliable techniques for determining a current status of an accessory device in relation to an electronic device are described.

20 Claims, 16 Drawing Sheets

SENSOR FUSION

CROSS REFERENCE TO RELATED APPLICATIONS

This application is a continuation of U.S. patent application Ser. No. 13/620,575, filed Sep. 14, 2012 and entitled "SENSOR FUSION" by Cretella, Jr. et al., which is a continuation of Ser. No. 13/037,271, filed Feb. 28, 2011 and entitled "SENSOR FUSION" by Cretella, Jr. et al., which claim priority under 35 U.S.C. 119(e) to (i) U.S. Provisional Patent Application No. 61/384,179, filed Sep. 17, 2010 and entitled "APPARATUS AND METHOD FOR MAGNETIC ATTACHMENT" by Lauder et al., and (ii) U.S. Provisional Patent Application No. 61/438,220, filed Jan. 31, 2011 and entitled "MAGNETIC ATTACHMENT UNIT AND METHODS OF USE" by Lauder et al., each of which are incorporated by reference in their entirety for all purposes. This application is also related to U.S. patent application Ser. No. 12/971,411, filed Dec. 17, 2010 and entitled "TABLET DEVICE HAVING A DISPLAY OPERABLE IN PEEK MODE" by Lauder et. al., now U.S. Pat. No. 8,395,465, which is also incorporated by reference in its entirety for all purposes.

FIELD OF THE DESCRIBED EMBODIMENTS

The described embodiments generally relate to portable electronic devices. More particularly, the present embodiments describe use of multiple sensors in combination to confirm a status of an accessory device in relation to an electronic device.

DESCRIPTION OF THE RELATED ART

Recent advances in portable computing includes the introduction of hand held electronic devices and computing platforms along the lines of the iPad™ tablet manufactured by Apple Inc. of Cupertino, Calif. These handheld computing devices can be configured such that a substantial portion of the electronic device takes the form of a display used for presenting visual content leaving little available space for an attachment mechanism that can be used for attaching an accessory device.

When the accessory device takes the form of a cover, the handheld computing device can be operable in modes consistent with the presence of the cover. For example, when the handheld computing device has a display, the presence of the cover can render the display unviewable. In order to save power, the unviewable display can be rendered temporarily inoperable until the cover is moved or otherwise repositioned to expose the display.

Therefore, accurate and reliable techniques for determining a current status of an accessory device in relation to an electronic device to which it is connected are desired.

SUMMARY OF THE DESCRIBED EMBODIMENTS

This paper describes various embodiments that relate to a system, method, and apparatus for releasably attaching an accessory to an electronic device.

A consumer electronic product includes at least an electronic device. In the described embodiment, the electronic device includes at least a processor and a first sensor in communication with the processor arranged to detect a first type stimulus. The first sensor responds to the first type stimulus by providing a first signal to the processor indicating a first status of an accessory device in relation to the electronic device. The electronic device also includes at least a second sensor in communication with the processor arranged to detect a second type stimulus. The second sensor responds to the second type stimulus by providing a second signal to the processor indicating a second status of the accessory device in relation to the electronic device. In the described embodiment, when the processor receives the first signal from the first sensor, the processor compares the first status indicated by the first signal and the second status indicated by the second signal and when the processor determines that the indications of the first and second status are the same, the processor accepts the first signal, otherwise, the processor ignores the first signal.

In one aspect of the described embodiment, the accessory device is a protective cover having a flap incorporating a magnetic element and the first sensor is a Hall Effect (HFX) sensor. The protective cover is pivotally attached to the electronic device such that in a closed configuration the magnetic element in the flap provides a first stimulus in the form of a saturating magnetic field that is detected by the HFX sensor only when the flap is in a closed configuration with respect to the electronic device. The second sensor is any of at least an ambient light sensor, a camera, a magnetometer, a multi-touch sensitive surface, an RFID device, and a second Hall Effect sensor.

In another embodiment, a consumer electronic product includes at least an electronic device and an accessory unit. In the described embodiment, the electronic product includes a processor, a Hall Effect sensor (HFX) in communication with the processor arranged to detect a saturating magnetic field and in response to the detected saturating magnetic field, provide a signal to the processor where the processor uses the signal to alter an operating state of the electronic device. The electronic device also includes a second sensor separate and distinct from the HFX sensor. The accessory unit includes a body portion pivotally attachable to the electronic device having at least a magnetic element. When the accessory unit is in a closed configuration, an inner surface of the body portion is placed in proximity to the protective top layer such that the magnetic element presents the saturating magnetic field to the HFX sensor. When the processor receives the signal from the HFX sensor indicating the presence of the saturating magnetic field, the processor queries the second sensor to corroborate the signal received from the HFX sensor is consistent with the cover being in the closed configuration, the processor accepts the signal from the HFX sensor, otherwise the processor ignores the signal from the HFX sensor.

In yet another embodiment, in a consumer electronic product that includes an electronic device, a method performed by a processor in the electronic device is described. The method can be carried out by performing at least the following operations: detecting a first type stimulus at a first sensor in communication with the processor, receiving a first signal from the first sensor at the processor, the first signal indicating a first status of an accessory device in relation to the electronic device, detecting a second type stimulus at a second sensor in communication with the processor, receiving a second signal from the second sensor at the processor, the second signal indicating a second status of the accessory device in relation to the electronic device, comparing the indication of the first status and the indication of the second status by the processor, and accepting the first signal by the processor only when the comparing determines that the indications of that the first and second status are the same.

In another embodiment, non-transitory computer readable medium for storing program code executable by a processor for detecting a state of a protective cover in relation to an electronic device having a processor and at least a first sensor and a second sensor is described. The computer readable medium includes at least computer code for receiving a signal from the first sensor indicating that the protective cover is in a closed configuration with respect to the electronic device, computer code for querying the second sensor, computer code for receiving information from the second sensor, and computer code for ignoring the signal from the first sensor when the information from the second sensor does not corroborate the signal from the first sensor; otherwise, accepting the signal from the first sensor.

In one aspect of the described embodiment, the protective cover includes a flap incorporating a magnetic element and the first sensor is a Hall Effect sensor. The protective cover is pivotally attached to the electronic device such that in a closed configuration the magnetic element in the flap provides a first stimulus in the form of a saturating magnetic field that is detected by the HFX sensor only when the flap is in a closed configuration with respect to the electronic device. The second sensor is any of at least an ambient light sensor, a camera, a magnetometer, a multi-touch sensitive surface, an RFID device, and a second Hall Effect sensor.

Other aspects and advantages of the invention will become apparent from the following detailed description taken in conjunction with the accompanying drawings which illustrate, by way of example, the principles of the described embodiments.

BRIEF DESCRIPTION OF THE DRAWINGS

The invention will be readily understood by the following detailed description in conjunction with the accompanying drawings, wherein like reference numerals designate like structural elements, and in which.

DETAILED DESCRIPTION OF SELECTED EMBODIMENTS

Figure 1:
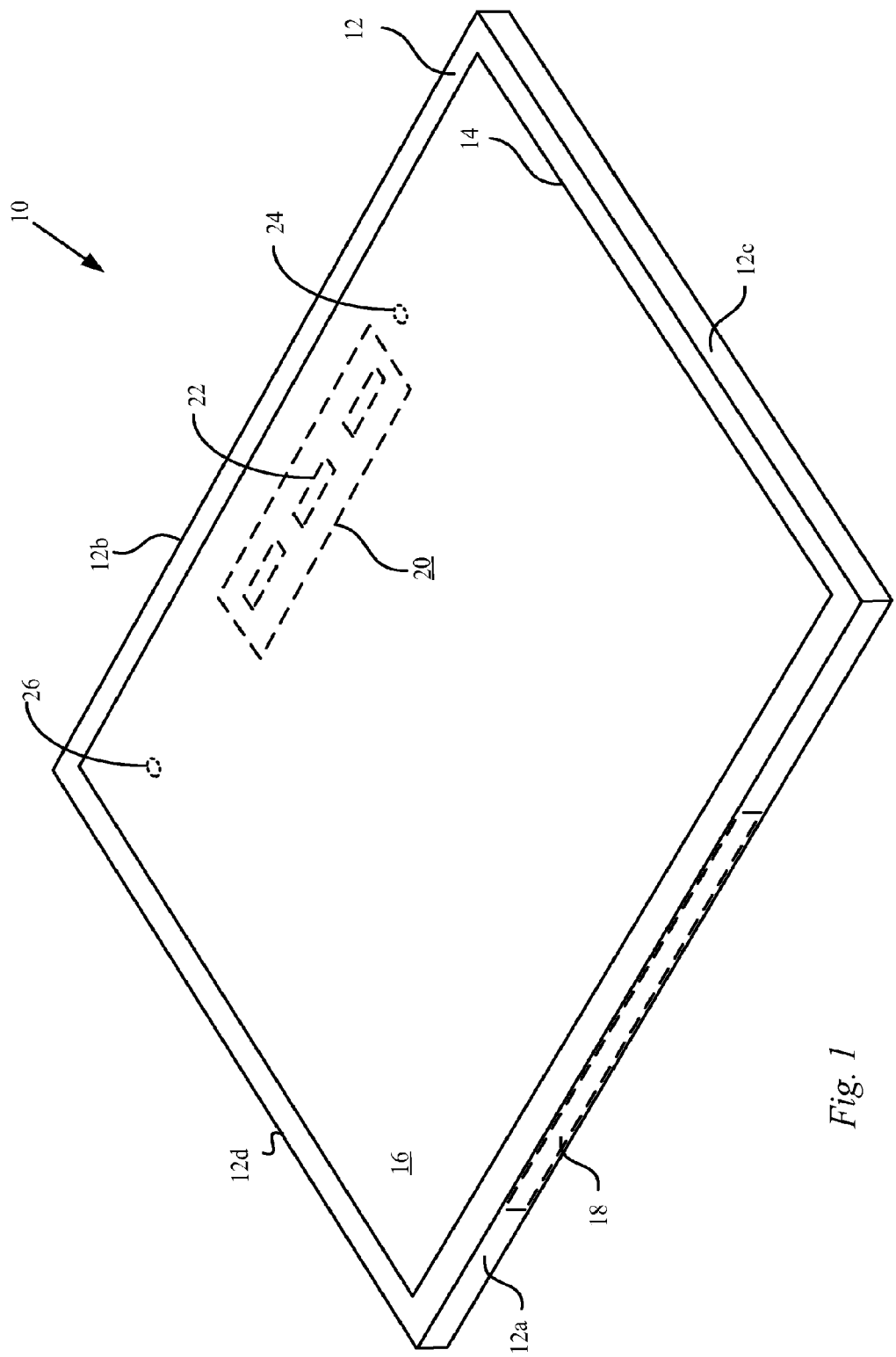
FIG. 1 shows a top perspective view of an electronic device in accordance with the described embodiments.

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

The following description relates in general to a mechanism that can be used to confirm a status of an accessory device in relation to an associated host device having operating states consistent with the accessory device status. More specifically, when the accessory device is a protective cover having a size and shape in accordance with the electronic device, the protective cover can have a hinge portion and flap pivotally attached to the hinge portion. The flap can rotate about the hinge portion in one direction to bring the flap in substantial contact with the electronic device in a closed configuration. Conversely, the flap can pivot about the hinge assembly in the other direction to expose the electronic device in an open configuration. In one embodiment, the electronic device can operate in a closed cover mode when the protective cover is detected to be in the closed configuration and an open cover mode when the cover is detected to be in the open configuration. The protective cover can provide protection to certain aspects (such as a display) of the electronic device while enhancing the overall look and feel of the electronic device. The protective cover can include at least a hinge portion. The hinge portion can be magnetically attached to the electronic device using a magnetic attachment feature. The hinge portion can be pivotally connected to a flap that can be placed upon a portion of the electronic device to be protected. The protective cover can include electronic circuits or other elements (passive or active) that can cooperate with electronic elements in the electronic device. As part of that cooperation, signals can be passed between the protective cover and the electronic device that can, for example, be used to modify operations of the electronic device, operations of electronic circuits or elements of the protective cover, and so forth.

The electronic device can include a magnetometer circuit that can be used to detect the directional magnitude of an external magnetic field. In this regard, the magnetometer can function as a compass arranged to indicate a directional bearing and magnitude of an external magnetic field. In this way, the directional heading of the electronic device in relation to the external magnetic field can be deduced. For example, when the external magnetic field is essentially the Earth's magnetic field, the onboard compass can provide an indication of the directional bearing of the electronic device in relation to the magnetic pole of the Earth. In one embodiment, the protective cover includes a flap having magnetic elements. The magnetic elements can include magnetic elements used for magnetic attachment and magnetic elements used to trigger a Hall Effect (HFX) sensor in the electronic device. In this situation, the onboard compass can be used to detect the presence of the flap based upon the effect of the magnetic elements on the onboard compass.

For example, the onboard compass can detect that the flap is magnetically attached to the electronic device based upon a first static magnetic deviation, also referred to as a hard magnetic offset. The first static magnetic deviation can be based upon the presence of magnetic elements included in the flap of the protective cover used to trigger the HFX sensor as well as magnetic elements used to magnetically attach the flap and the electronic device. In another embodiment, the compass can detect a dynamic magnetic displacement in accordance with movement of the magnetic elements in the flap as the flap rotates about the pivot axis of the hinge assembly. The dynamic magnetic displacement can be used to determine if the flap is in motion relative to the onboard compass. In one embodiment, the relative displacement of the flap and the electronic device can be deduced from data received in real time from an accelerometer and gyroscope. The data from the accelerometer and gyroscope can be related to the spatial orientation of the electronic device. The spatial orientation data and magnetic readings from the onboard compass can be used to determine if the magnetic elements in the flap are moving in relation to the electronic device providing an indication that the flap is rotating about the pivot line of the hinge assembly.

In one embodiment, the electronic device can have a touch sensitive surface that can react to a plurality of conductive elements incorporated into the protective cover near an inner layer of the protective cover. The plurality of conductive elements can be grounded when the protective cover is magnetically attached to the electronic device. In one embodiment, the conductive elements can be arranged in a pre-determined and therefore recognizable pattern. In this way, when an inner layer of the protective cover includes elements capable of interacting with the touch sensitive surface, the elements can be arranged in a pre-determined pattern in order to assist the electronic device in detecting the current position of the protective cover. For example, in one embodiment, the touch sensitive surface can be capacitive in nature in which case the embedded elements in the protective cover can be formed of conductive material such as metal along the lines of aluminum. The conductive elements can be grounded in order to increase a capacitive signal to noise ratio of the signal generated by the interaction between capacitive touch sensitive surface and the capacitive embedded elements.

The magnetic elements in the flap portion can interact with a magnetically sensitive circuit incorporated into the electronic device. The magnetically sensitive circuit can in one embodiment take the form of the HFX sensor that can detect the presence of an extrinsic magnetic field provided by the magnetic element in the protective cover. It should be noted, however, that in order to trigger the HFX sensor, the detected magnetic field must saturate the HFX sensor. In this way, the likelihood that the HFX sensor provides a false indication that the protective cover is enclosing the electronic device is greatly reduced. For example, the relatively weak magnetic field strength associated with the Earth's magnetic field is insufficient to saturate the HFX sensor thereby triggering a false indication of the protective cover status.

When the HFX sensor is exposed to a saturating magnetic field (i.e., one of sufficient magnetic strength to saturate the HFX sensor), the HFX sensor can respond to the saturating magnetic field by generating a binary (i.e., ON/OFF) signal. One of the advantages of using the HFX sensor (in addition to reducing the likelihood of a false cover status indication) is that the amount of power required to operate the HFX sensor is relatively small and therefore does not present an undue power drain on the electronic device. In any case, when the HFX sensor is exposed to the saturating magnetic field, the HFX sensor can issue a signal. The signal can be received by a processing unit and used to alter an operating state of the electronic device. It should be noted, however, that any appropriate sensing device in addition to or in place of the HFX sensor can be used to detect the status of the protective cover in relation to the electronic device. For example, a magnetometer (a form of which can be used as a compass) can be used in lieu of the HFX sensor. In contrast to the HFX sensor, the magnetometer is substantially more sensitive to an extrinsic magnetic field and will respond accordingly by providing a more continuous (analog) signal representative of the extrinsic magnetic field requiring a greater amount of power. Accordingly, dynamic magnetic activity can be detected by the magnetometer (indicative of, for example, relative motions of the magnetometer and a magnetic source) by periodically sampling the signal from the magnetometer. The sampled data can be used, for example, to provide a relative position of the magnetic elements in the protective cover in relation to the magnetometer in the electronic device.

Accordingly, the protective cover can include a magnetic element such as a permanent magnet having a magnetic field that can cause the HFX sensor to generate the signal. The magnetic element can be positioned on the protective cover in a location that triggers the HFX sensor to generate the signal when the cover is placed on or in proximity to a surface of the electronic device. The signal can indicate that the protective cover is in a predetermined position relative to the electronic device that can result in a change in an operating state of the electronic device. For example, with the portion of the protective cover having the magnetic element in proximity to the HFX sensor, the magnetic field from the magnetic element can cause the HFX sensor to generate a signal. The signal can, in turn, be used to alter the operating state to one consistent with a portion of the electronic device being covered. For example, when the electronic device includes a display, the protective cover can be used to cover the display and therefore render it unviewable and therefore the display can be disabled. On the other hand, when the portion of the protective cover having the magnetic element is removed to the point where the HFX sensor no longer responds to the magnetic field of the magnetic element, then the HFX sensor can generate another signal. The other signal can result in the electronic device entering another, different, operating state consistent with at least a portion of the display being uncovered and viewable and therefore enabled for displaying visual content.

However, the HFX sensor can be triggered by any magnetic field strong enough to saturate the HFX sensor thereby potentially providing a false indication of the presence of the protective cover. Therefore in order to avoid such false indications, when the HFX sensor is triggered, additional sensors can be queried in order to confirm that indication provided by the HFX sensor that the protective cover is in the closed configuration. In one embodiment, a triggering event at the HFX sensor indicating that the cover is in the closed configuration can also cause the electronic device to query at least another sensor in order to confirm the closed configuration indicated by the HFX sensor.

In one embodiment, an ambient light sensor (ALS) can be queried by the electronic device. The ALS can include a photosensitive circuit (such as a photodiode) that can respond to varying levels of incident light, typically in the form of ambient light. In one embodiment, the ALS can detect ambient light. The ALS can, however, be configured to respond to the detection of the ambient light in many ways. For example, the ALS can respond by providing a signal whenever the photosensitive circuit within the ALS detects an amount (i.e., intensity) of ambient light greater than a pre-defined amount of ambient light. In other words, the threshold amount of ambient light can be a defined threshold level. For example, a threshold amount of "x" lumens can represent an amount of ambient light consistent with the protective cover being in a closed configuration where the value "x" takes into account light leaking in from around the edges of the protective cover. Of course, the threshold amount of ambient light can be set to any amount deemed appropriate. For example, in some cases where the electronic device is in bright environment such as daylight, the amount of light leakage can be much higher than would be expected in darker conditions. Therefore, the amount of light leaking around the edges of the protective cover can be substantially greater and therefore, the threshold amount of light consistent with the protective cover being in the closed configuration can increased to take this fact into account.

In another embodiment, the threshold amount can be consistent with a differential change in ambient light detected by the photosensitive circuit in the ALS. For example, in those situations where electronic device is in a bright environment (such as outdoors in daylight), there can be substantial amount of light leakage when the protective cover is in fact closed. However, in order to reduce uncertainties related to just how much light leakage there really is, the ALS can be configured to provide a signal based upon a differential change in the amount of light detected by the photosensitive circuit within the ALS. For example, when the protective cover is open, the ALS can detect an amount of light represented by "$y_1$" lumens. However, when the protective cover is closed, the amount of light detected by the photosensitive circuit in the ALS can change from "$y_1$" to "$y_2$" lumens. Only in those situations where the difference in the amount of light detected (i.e., $\Delta y = abs\, (y_1 - y_2)$) is greater than a predetermined value, will the ALS provide the appropriate signal indicating that the protective cover is in the closed configuration. The advantage to this approach lies in the fact that light leakage values are difficult to deduce and therefore by relying upon a well-defined change in detected ambient light a more accurate and robust indication of the status of the protective cover in relation to the electronic device can be forthcoming.

Therefore, by using the ALS, the electronic device can corroborate the indication of the status of the protective cover provided by the HFX sensor. In this way, if the ALS corroborates the indication from the HFX sensor by detecting an amount of ambient light consistent with the protective cover being in the closed configuration, the electronic device can accept the indication from the HFX sensor and alter the operating state of the electronic device accordingly. However, if the amount of ambient light is not consistent with the signal from the HFX sensor indicating that the protective cover is in the closed, configuration, the electronic device can query another sensor in order to obtain yet another data point to be used in evaluating the signal from the HFX sensor or more simply can ignore the indication from the HFX sensor altogether thereby presuming that the cover is not fully covering the electronic device and therefore the operating state of the electronic device will not be altered to one consistent with the electronic device being fully covered. If, however, the ALS detects an amount of light that corroborates the indication from the Hall Effect, then the electronic device can accept the indication from the HFX sensor that the protective cover is in the closed configuration and can thereby respond accordingly.

In another embodiment, a camera can be activated and based upon a type of image captured by the camera, can be used to corroborate the indication provided by the HFX sensor that the cover is closed. For example, when the cover is closed, the camera can capture an image that is essentially black (or very low luminance value). However, if the electronic device is located within dark environment such as a dark room, outdoors at night with little or no moonlight or other external light sources, and so on, what little external illumination there is (such as from the display) can provide sufficient illumination (on the end user's face for example) for the camera to capture an image. In one embodiment, the captured image can be characterized for an overall luminance value or luminance histogram which can be used to determine if the cover is fully closed or partially closed. For example, even with the cover fully closed, there may be some light leakage that can be captured by the camera resulting in a low luminance captured image. However, in another embodiment, the camera can be adjusted in such a way the unless there is sufficient light on the image capture device within the camera, there will be no image registered by the camera based upon, for example, a defined specification for light leakage. If, however, an image is captured by the camera, by evaluating the overall luminance value of the captured image (less than a threshold luminance value for example), the position of the protective cover can be estimated and used to corroborate (or not) the indication from the HFX sensor.

In another embodiment, a magnetometer in the form of an onboard compass can be used to detect the presence of a hard magnetic offset consistent with the magnetic element embedded in the protective cover in place at or near the HFX sensor. In this embodiment, the presence of the hard magnetic offset can be used to confirm the indication from the HFX sensor of the closed cover state. On the other hand, the absence of the hard magnetic offset can be used by the electronic device to decide that the indication from the HFX sensor is not accurate with regards to the state of the protective cover and can therefore be ignored, or other actions such as querying another sensor can be undertaken.

It should also be noted that magnetic materials included in the protective cover can affect the performance of the magnetometer such as the onboard compass. In particular, the basic operations of the onboard compass (embodied as instructions executable by a processor or other appropriate circuit) can be altered by the presence of the magnetic materials in the protective cover. In particular, the motion of the protective cover can be detected by the onboard compass as a change in magnetic field strength and direction that can result in an "error" since the onboard compass will experience a dynamic offset based upon the positional change in the protective cover. For example, when the cover is going from the open to closed configuration, the dynamic offset at the onboard compass can increase due to the fact that the magnetic elements within the protective cover are moving closer to the magnetometer and are therefore inducing a greater offset value in the readings of the onboard compass (of course, just the opposite occurs when the cover status changes from closed to open).

The maximum offset, or differential in compass heading, experienced by the onboard compass that can be induced by the change in position of the magnetic element in the protective cover is a function of the change in the magnitude of the magnetic field as seen by the magnetic sensor associated with the onboard compass when the position of the protective cover changes as well as the horizontal strength of the external magnetic field. In order to compensate for the offset induced by the motion of the protective cover (more specifically the magnetic elements in the protective cover), the onboard compass can utilize a model of the maximum change in magnetic field magnitude that the onboard compass can detect as a function of change in cover position. In this way, by using both the model of the maximum change in magnetic field magnitude as a function of cover position and a current estimate of the magnitude of the horizontal component of the external magnetic field, the electronic device can estimate a maximum change in compass heading likely to be induced by the relative change in position of the protective cover in relation to the electronic device.

Accordingly, an accelerometer and gyroscope incorporated within the electronic device can be used in conjunction with the compass to evaluate a dynamic magnetic signature of changes in detected external magnetic field. The accelerometer and gyroscope can provide, in real time, the spatial position and rotation of the electronic device and the compass can provide an indication, again in real time, of changes in external magnetic field. The readings from the accelerometer and gyroscope and the compass can be used together and compared to a model of the motion of the magnetic elements in relation to the electronic device and, in turn, be used to evaluate the likelihood that the cover is present and moving in relation to the electronic device (by way of the compass).

These and other embodiments are discussed below with reference to FIGS. 1-15. However, those skilled in the art will readily appreciate that the detailed description given herein with respect to these figures is for explanatory purposes only and should not be construed as limiting. For the remainder of this discussion, a first and second object each suitably configured to magnetically attach to each other in accordance with the described embodiments will be described. It should be noted, however, that any number and type of suitably configured objects can be magnetically attached to each other in a precise and repeatable manner. In particular, for simplicity and clarity, for the remainder of this discussion, the first object is presumed to take the form of an electronic device and in particular a handheld electronic device.

The electronic device can take many forms. For the remainder of this discussion, the electronic device is described in terms of a handheld portable computing device. Accordingly, FIG. 1 shows a top perspective view of electronic device 10 in accordance with the described embodiments. Electronic device 10 can process data and more particularly media data such as audio, visual, images, etc. By way of example, electronic device 10 can generally correspond to a device that can perform as a smart phone, a music player, a game player, a visual player, a personal digital assistant (PDA), a tablet computer and the like. Electronic device 10 can also be hand held. With regards to being handheld, electronic device 10 can be held in one hand while being operated by the other hand (i.e., no reference surface such as a desktop is needed). Hence, electronic device 10 can be held in one hand while operational input commands can be provided by the other hand. The operational input commands can include operating a volume switch, a hold switch, or by providing inputs to a touch sensitive surface such as a touch sensitive display device or a touch pad.

Electronic device 10 can include housing 12. In some embodiments, housing 12 can take the form of a single piece housing formed of any number of materials such as plastic or non-magnetic metal which can be forged, molded, or otherwise formed into a desired shape. In those cases where electronic device 10 has a metal housing and incorporates radio frequency (RF) based functionality, a portion of housing 12 can include radio transparent materials such as ceramic, or plastic. Housing 12 can be configured to enclose a number of internal components. For example, housing 12 can enclose and support various structural and electrical components (including integrated circuit chips) to provide computing operations for electronic device 10. The integrated circuits can take the form of chips, chip sets, or modules any of which can be surface mounted to a printed circuit board, or PCB, or other support structure. For example, a main logic board (MLB) can have integrated circuits mounted thereon that can include at least a microprocessor, semi-conductor memory (such as FLASH), and various support circuits and so on. Housing 12 can include opening 14 for placing internal components and as necessary can be sized to accommodate display assembly for presenting visual content, the display assembly being covered and protected by cover layer 16. In some cases, the display assembly can be touch sensitive allowing tactile inputs that can be used to provide control signals to electronic device 10. In some cases, the display assembly may be a large prominent display area that covers a majority of the real estate on the front of the electronic device.

Electronic device 10 can include a magnetic attachment system that can be used to magnetically attach electronic device 10 to at least one other suitably configured object. The magnetic attachment system can include a number of magnetic attachment features distributed within and in some cases connected to housing 12. For example, the magnetic attachment system can include first magnetic attachment feature 18 and second magnetic attachment feature 20 located on different sides of electronic device 10. In particular, first magnetic attachment feature 18 can be located in proximity to side wall 12a of housing 12. Second magnetic attachment feature 20 can be located within opening 14 near side wall 12b of housing 12. In those embodiments where electronic device 10 includes a display with cover glass substantially filling opening 14, second attachment feature 20 can be placed beneath the cover layer.

The placement of first magnetic attachment feature 18 at side wall 12a can facilitate the use of magnetic attachment feature 18 to magnetically attach electronic device 10 to another suitably configured object such as another electronic device or an accessory device. Accordingly, without loss of generality, first magnetic attachment feature 18 will henceforth be referred to as device attachment feature 18. The placement of second magnetic attachment feature 20, on the other hand, can facilitate the use of second magnetic attachment feature 20 to secure aspects of another device attached to electronic device 10 by way of device attachment feature 18. In this way, the overall attachment between the other device and electronic device 10 can be more secure than attaching through first attachment feature 18 alone. Accordingly, and again without loss of generality, second attachment feature 20 will henceforth be referred to as securing attachment feature 20. Securing attachment feature 20 can include one or more of magnetic elements 22. When a plurality of magnetic elements is used, the arrangement of the plurality of magnetic elements can be widely varied and can magnetically interact with a cooperating feature on another device. In one embodiment, the plurality of magnetic elements associated with securing feature 20 can assist in securing at least a portion of another device otherwise attached to electronic device 10 by way of device attachment feature 18. Electronic device 10 can also include Hall Effect sensor 24 and magnetometer circuit 26 in the form of onboard compass 26.

Figure 2A:
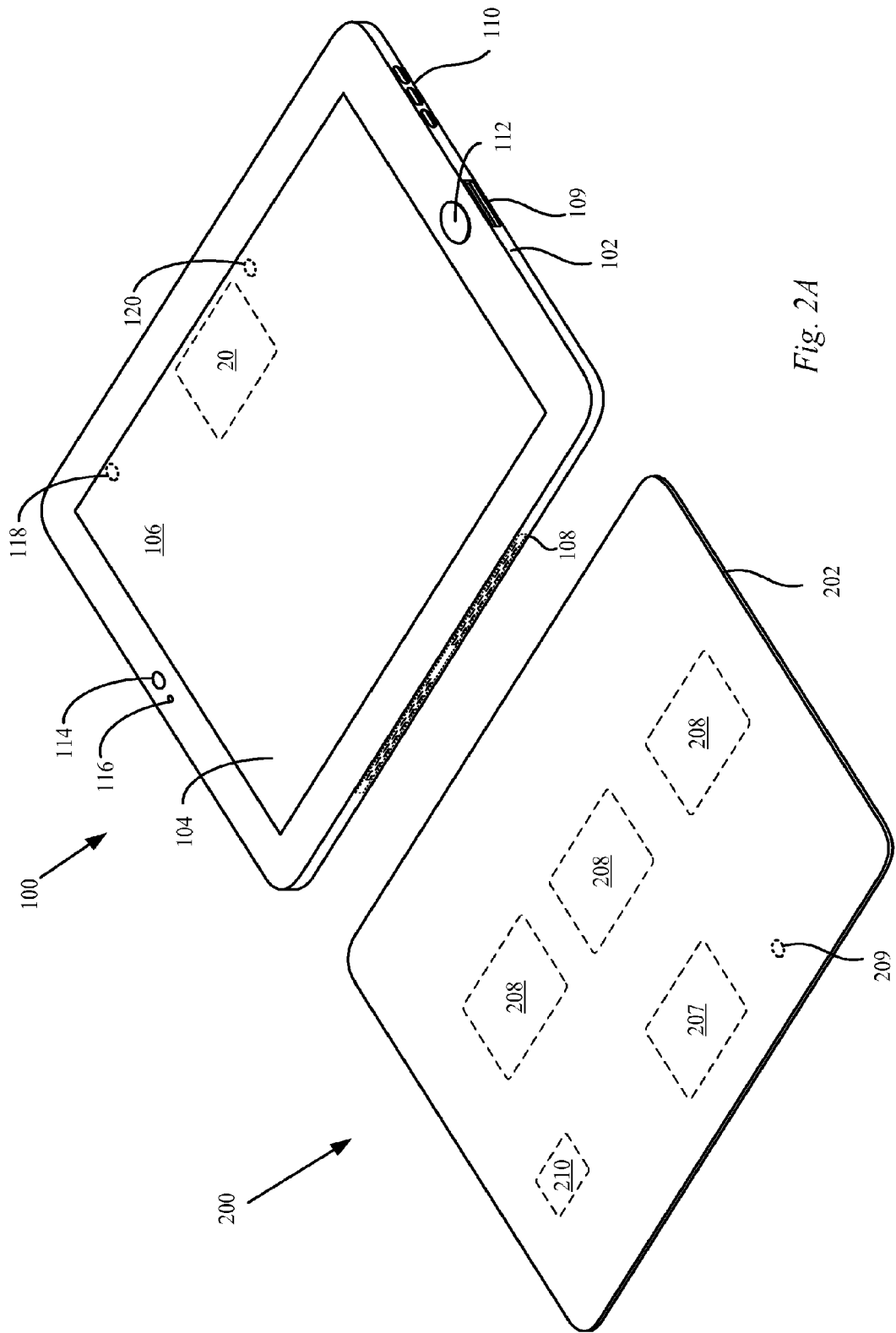
FIG. 2A shows a first perspective view of the electronic device in the form of a tablet device and the accessory device in the form of a protective cover.
Figure 2B:
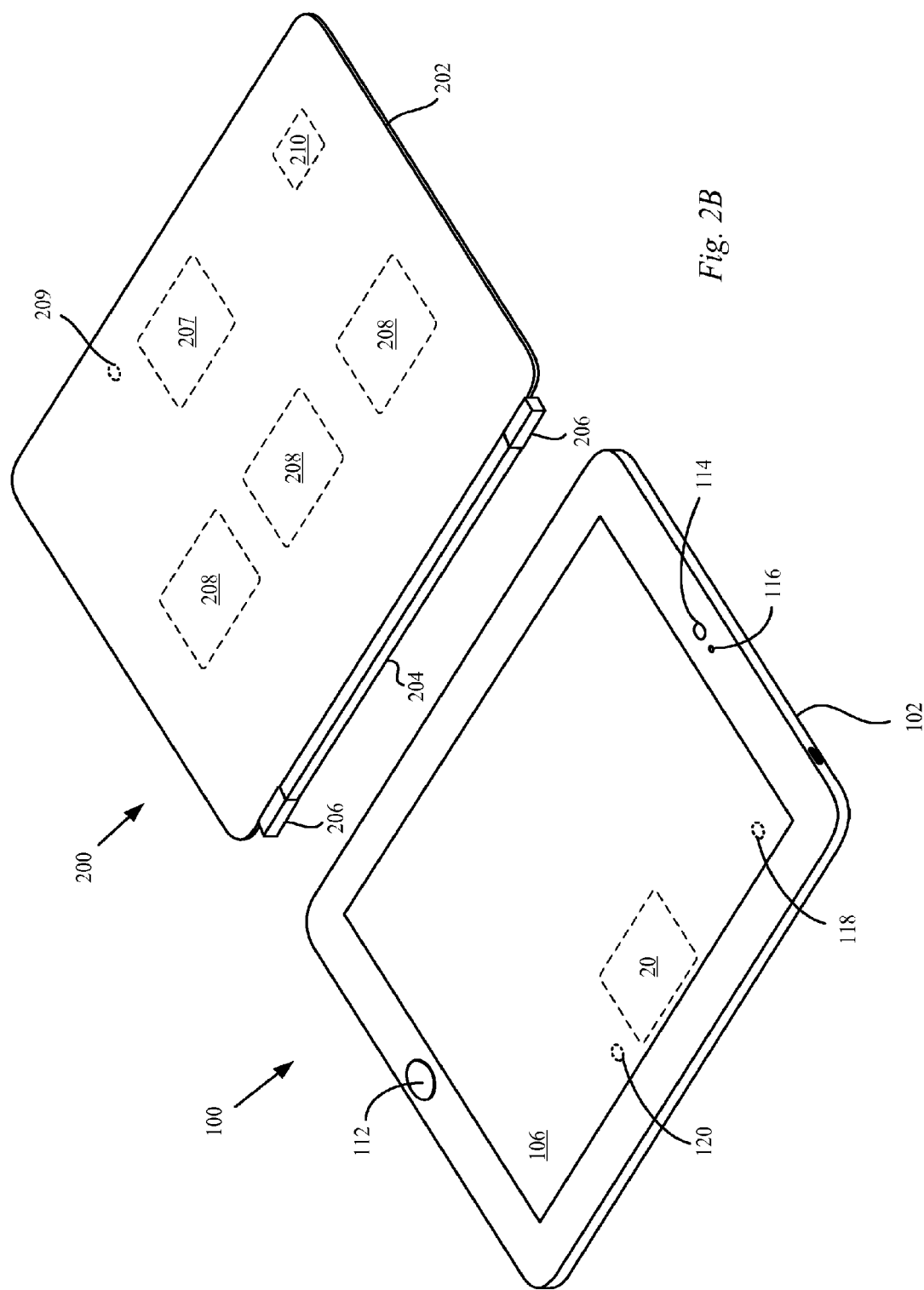
FIG. 2B shows a second perspective view of the electronic device in the form of a tablet device and the accessory device in the form of a protective cover.

The remainder of this discussion will describe particular embodiments of devices that can use the magnetic attachment system. In particular, FIG. 2A and FIG. 2B show electronic device 100 presented in terms of tablet device 100 and accessory device 200 is shown as protective cover 200 each in perspective top views. These elements may generally correspond to any of those previously mentioned. In particular, FIGS. 2A and 2B shows two perspective views of tablet device 100 and protective cover 200 in the open configuration. For example, FIG. 2A shows device attachment feature 108 included in tablet device 100 and its relationship to tablet device 100. FIG. 2B, on the other hand, is the view presented in FIG. 2A rotated about 180° to provide a second view of attachment feature 202 and its relationship with protective cover 200.

Tablet device 100 can take the form of a tablet computing device such as the iPad™ manufactured by Apple Inc. of Cupertino, Calif. Referring now to FIG. 2A, tablet device 100 can include housing 102 that can enclose and support device attachment feature 108. In order to not interfere with the magnetic field generated by device attachment feature 108, at least that portion of housing 102 nearest device attachment feature 108 can be formed of any number of non-magnetic materials such as plastic or non-magnetic metal such as aluminum. Housing 102 can also enclose and support internally various structural and electrical components (including integrated circuit chips and other circuitry) to provide computing operations for tablet device 100. Housing 102 can include opening 104 for placing internal components and can be sized to accommodate a display assembly or system suitable for providing a user with at least visual content as for example via a display. In some cases, the display assembly can include touch sensitive capabilities providing the user with the ability to provide tactile inputs to tablet device 100 using touch inputs. The display assembly can be formed of a number of layers including a topmost layer taking the form of transparent cover glass 106 formed of polycarbonate or other appropriate plastic or highly polished glass. Using highly polished glass, cover glass 106 can substantially fill opening 104.

Although not shown, the display assembly underlying cover glass 106 can be used to display images using any suitable display technology, such as LCD, LED, OLED, electronic or e-inks, and so on. The display assembly can be placed and secured within the cavity using a variety of mechanisms. In one embodiment, the display assembly is snapped into the cavity. It can be placed flush with the adjacent portion of the housing. In this way, the display can present visual content that can include visual, still images, as well as icons such as graphical user interface (GUI) that can provide information the user (e.g., text, objects, graphics) as well as receive user provided inputs. In some cases, displayed icons can be moved by a user to a more convenient location on the display.

In some embodiments, a display mask can be applied to, or incorporated within or under cover glass 106. The display mask can be used to accent an unmasked portion of the display used to present visual content and can be used to make less obvious device attachment feature 108 and securing attachment feature 20. Tablet device 100 can include various ports that can be used to pass information between tablet device 100 and the external environment. In particular, data port 109 can facilitate the transfer of data and power whereas speakers 110 can be used to output audio content. Home button 112 can be used to provide an input signal that can be used by a processor included in tablet device 100. The processor can use the signal from home button 112 to alter the operating state of tablet device 100. For example, home button 112 can be used to reset a currently active page presented by the display assembly. Tablet device 100 can also include camera assembly 114 arranged to capture an image or images. Tablet device 100 can also include ambient light sensor 116 (ALS) used to detect a level of ambient light. In one embodiment ALS 116 can be used to set a brightness level of the display assembly. For example, in a darker environment with little ambient light, the readings from ALS 116 can cause a processor in tablet device 100 to dim the display assembly. In a brighter environment, the display assembly can be made brighter. Tablet device can further include compass 118 used to detect external magnetic fields that can help in the determination of a position of tablet device 100. Tablet device 100 can also include Hall Effect sensor 120 that can be used to detect the presence of a magnetic element in when cover 200 is placed on top of tablet device 100 in a closed configuration. An accelerometer and gyroscope (not shown) can determine any dynamic changes in the position and orientation of tablet device 100 in real time.

Figure 3A:
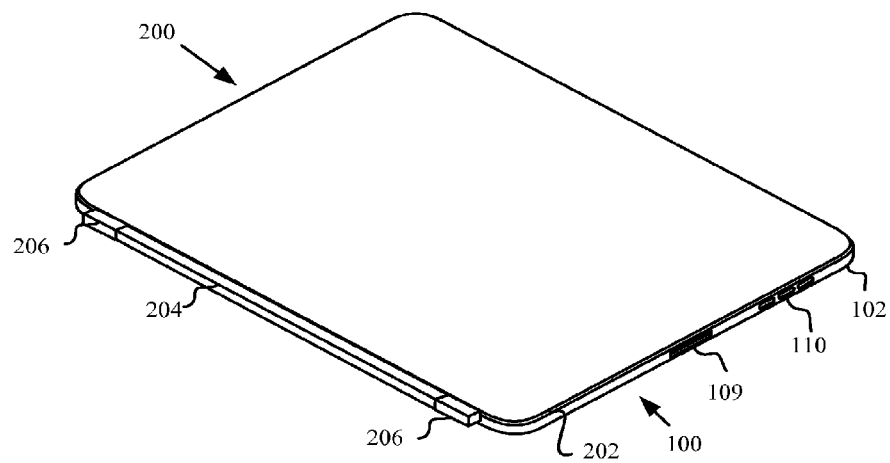
FIG. 3A shows a closed configuration of the cooperating system formed by the tablet device and protective cover shown in FIGS. 2A and 2B.

Protective cover 200 can have a look and feel that complements that of the tablet device 100 adding to overall look and feel of tablet device 100. Protective cover 200 is shown in FIGS. 2A and 2B attached to tablet device 100 in an open configuration in which cover glass 106 is fully viewable. Protective cover 200 can include flap 202. In one embodiment, flap 202 can have a size and shape in accordance with cover glass 106. Flap 202 can be pivotally connected to accessory attachment feature 204 by way of hinge assembly 206 each shown in FIG. 2B. In this way, flap 202 can rotate about pivot line 211. The magnetic attachment force between attachment feature 204 and device attachment feature 108 can maintain protective cover 200 and tablet device 100 in a proper orientation and placement vis-a-vis flap 202 and cover glass 106. By proper orientation it is meant that protective cover 200 can only properly attach to tablet device 100 having flap 202 and cover glass 106 aligned in a mating engagement. The mating arrangement between cover glass 106 and flap 202 is such that flap 202 covers substantially all of cover glass 106 when flap 202 is placed in contact with cover glass 106 as shown in FIG. 3A.

Flap 202 can be pivotally connected to hinge assembly 206 that, in turn, can be connected to attachment feature 204. Hinge assembly 206 can, in turn, be coupled to electronic device 100 by way of accessory attachment feature 204. In this way, the flap 202 can be used as a protective cover to protect aspects of electronic device 100 such as a display cover 106. Flap 202 can be formed of various materials such as plastic, cloth, and so forth. Flap 202 can be segmented in such a way that a segment of the flap can be lifted to expose a corresponding portion of the display. Flap 202 can also include a functional element that can cooperate with a corresponding functional element in electronic device 100. In this way, manipulating flap 202 can result in an alteration in the operation of electronic device 100.

Flap 202 can include magnetic material. For example, magnetic elements 207 can be used to magnetically attach to corresponding magnetic attachment feature 20 whereas magnetic element 209 can be used to activate Hall Effect sensor 120 when flap 202 is in position above cover glass 106. In this way, Hall Effect sensor 120 can respond by generating a signal that can, in turn, be used to alter an operating state of electronic device 100. Since the cover can be easily attached directly to the housing of the tablet device without fasteners, the flap 202 can essentially conform to the shape of electronic device 100. In this way, the cover 200 will not detract or otherwise obscure the look and feel of electronic device 100. Flap 202 can also include capacitive elements 208 arranged in a defined pattern. Capacitive elements 208 can be used to activate a multi-touch (MT) sensitive layer incorporated in display assembly. When flap 202 is placed upon cover glass 106, the MT sensitive layer can respond to the presence of capacitive elements 208 by generating a touch pattern consistent with the defined pattern. In this way, the signal from Hall Effect sensor 120 indicating the presence of flap 202 in the closed configuration can be corroborated. When corroborated, tablet device 100 can accept the indication from Hall Effect sensor 120 that flap 202 is in the closed configuration and react accordingly.

In one embodiment, flap 202 can include RFID device 210 that can be used to identify protective cover 200. In particular, when protective cover 200 is in the closed configuration, flap 202 can be in contact with cover glass 106 thereby allowing a RFID sensor within tablet device 100 to "read" RFID device 210. In this way not only can the indication from Hall Effect sensor 120 be corroborated, but an identification of protective cover 200 can also be performed.

Figure 3B:
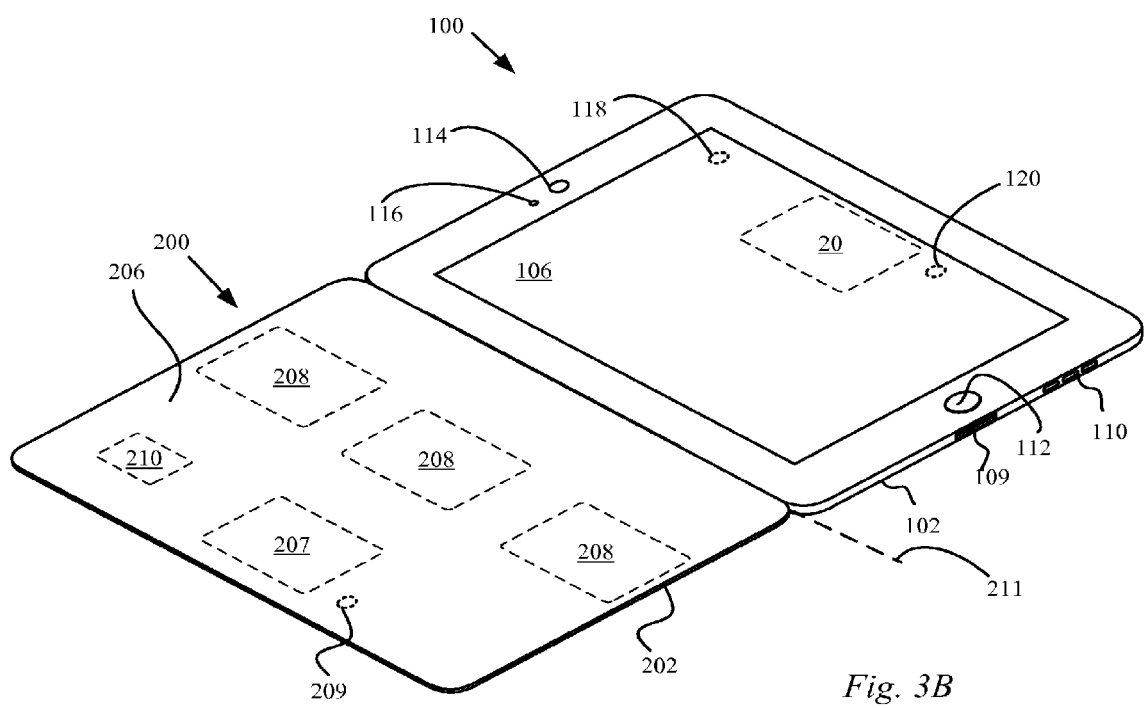
FIG. 3B shows an open configuration of the cooperating system shown in FIG. 3A.

FIGS. 3A and 3B show protective cover 200 and tablet device 100 magnetically attached to each other. FIG. 3A shows a closed configuration in which cover glass 106 is fully covered by and in contact with flap 202. Protective cover 200 can pivot about hinge assembly 206 from the closed configuration of FIG. 3A to an open configuration of FIG. 3B. In the closed configuration, inner layer of flap 202 can come in direct contact with cover glass 106. In this way, capacitive elements 208 can be detected by MT circuit disposed within the display assembly beneath cover glass 106. Moreover, the MT circuit can detect a pattern, or signature, corresponding to the pattern of capacitive elements 208. In this way, the detection of the pattern can corroborate the indication from Hall Effect sensor 120 that flap 202 is in contact with cover glass 106. If the pattern is not detected, then tablet device 100 can ignore the indication from Hall Effect sensor 120 (or possibly use another sensor, such as ALS 116 as a further check).

In order to transition from the closed to the open configuration, releasing force $F_{release}$ can be applied to flap 202. Releasing force $F_{release}$ can overcome the magnetic attractive force between attachment feature 207 in flap 202 and attachment feature 110 in tablet device 100. Hence, protective cover 200 can be secured to tablet device 100 until releasing force $F_{release}$ is applied to flap 202. In this way, flap 202 can be is used to protect cover glass 106. For example, protective cover 200 can be magnetically attached to tablet device 100. Flap 202 can then be placed upon and magnetically secured to cover glass 106 by the magnetic interaction between magnetic attachment feature 20 and 207. Flap 202 can be detached from cover glass 106 by the application of releasing force $F_{release}$ directly to flap 202. Releasing force $F_{release}$ can overcome the magnetic attraction between magnetic attachment features 20 and 207. Hence, flap 202 can then move away from cover glass 106 unhindered.

Figure 4:
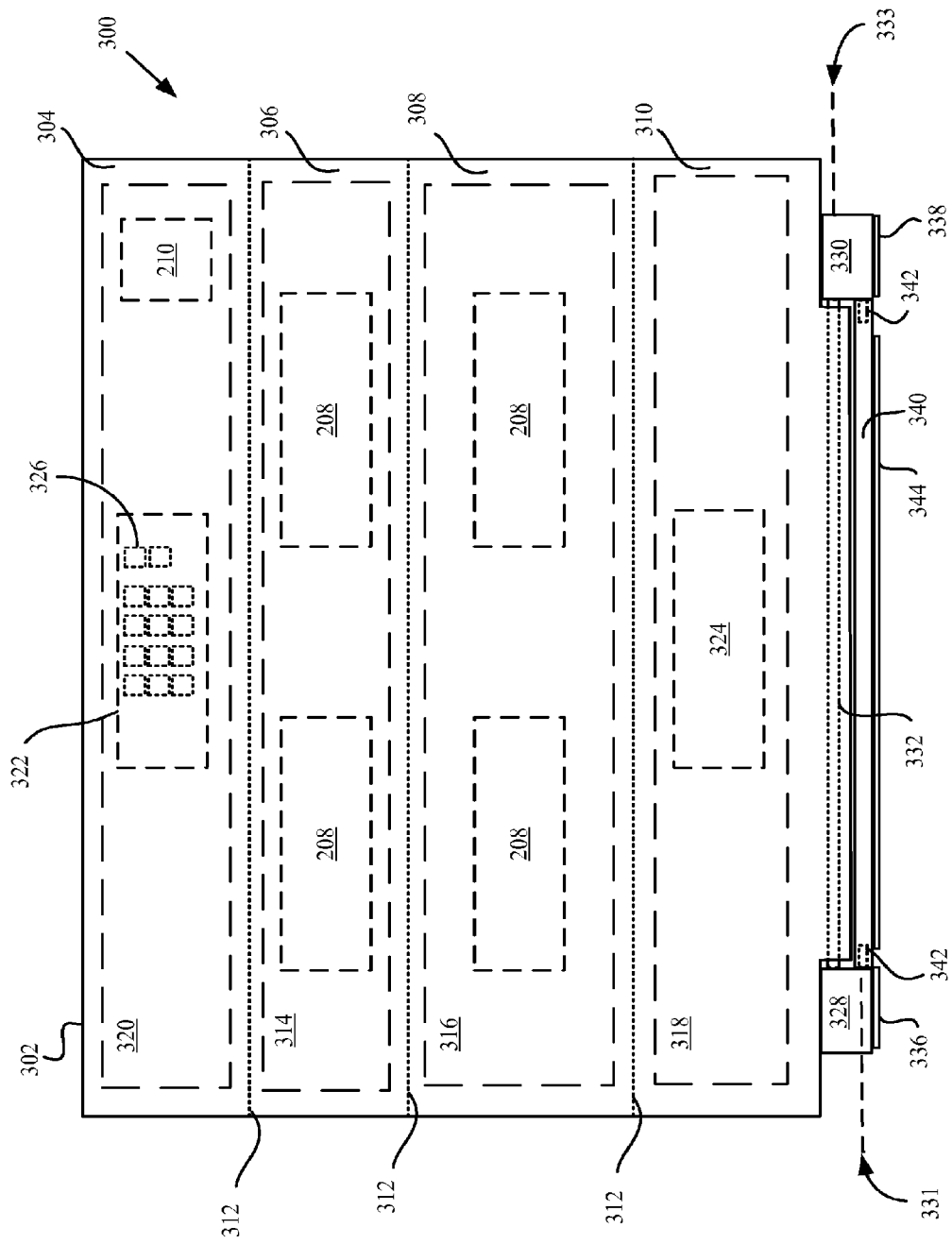
FIG. 4 shows a top view of an embodiment of a segmented cover assembly.

FIG. 4 shows a top view of a specific embodiment of protective cover 200 in the form of segmented cover 300. Segmented cover 300 can include body 302. Body 302 can have a size and shape in accordance with tablet device 100. Body 302 can be formed from a single piece of foldable or pliable material. Body 302 can also be divided into segments separated from each other by a folding region. In this way, the segments can be folded with respect to each other at the folding regions. In one embodiment, body 302 can be formed layers of material attached to one another forming a laminate structure. Each layer can take the form of a single piece of material that can have a size and shape in conformance with body 302. Each layer can also have a size and shape that correspond to only a portion of body 302. For example, a layer of rigid or semi-rigid material about the same size and shape of a segment can be attached to or otherwise associated with the segment.

In another example, a layer of rigid or semi-rigid material having a size and shape in accordance with body 302 can be used to provide segmented cover 300 as a whole with a resilient foundation. It should be noted that the layers can each be formed of materials having desired properties. For example, a layer of segmented cover 300 that comes in contact with delicate surfaces such as glass can be formed of a soft material that will not mar or otherwise damage the delicate surface. In another embodiment, a material such as micro-fiber can be used that can passively clean the delicate surface. On the other hand, a layer that is exposed to the external environment can be formed of a more rugged and durable material such as plastic or leather. In yet another embodiment, capacitive elements 208 can be incorporated within the laminate structure of cover assembly 300.

In a specific embodiment, segmented body 302 can be partitioned into a number of segments 304-310 interspersed with thinner, foldable portions 312. Each of the segments 304-310 can include one or more inserts disposed therein. By way of example, the segments can include a pocket region where the inserts are placed or alternatively the inserts may be embedded within the segments (e.g., insert molding). If pockets used, the pocket region can have a size and shape to accommodate corresponding inserts. The inserts can have various shapes but are most typically shaped to conform to the overall look of segmented body 302 (e.g., rectangular). The inserts can be used to provide structural support for segmented body 302. That is, the inserts can provide stiffness to the cover assembly. In some cases, the inserts may be referred to as stiffeners. As such, the cover assembly is relatively stiff except along the foldable regions that are thinner and do not include the inserts (e.g., allows folding) making segmented cover 300 more robust and easier to handle. In one embodiment segments 304, 306, and 310 can be related to segment 308 in size in the proportion of about 0.72 to 1 meaning that segments 304, 306 and 310 are sized in width to be about 72% of the width of segment 308. In this way, a triangle having appropriate angles can be formed (i.e., about 75° for display stand and about 11° for keyboard stand discussed below).

Segments 306, 308, and 310 can include inserts 314, 316, and 318, respectively (shown in dotted lines form). Inserts 314-318 can be formed of rigid or semi-rigid material adding resiliency to body 302. Examples of materials that can be used include plastics, fiber glass, carbon fiber composites, metals, and the like. Segment 304 can include insert 320 also formed of resilient material such as plastic but also arranged to accommodate magnetic elements 322 some of which can interact with magnetic elements in table device 1100 and more specifically attachment feature 110. Inserts 314-318 can also incorporate capacitive elements 208 that can be sensed by a MT sensitive portion of the display of tablet device 100.

Due to the ability of segmented body 302 to fold and more particularly the various segments to fold with respect to each other, most of magnetic elements 322 can be used to magnetically interact with magnetically active insert 324 embedded in insert 318. By magnetically binding both active insert 324 and magnetic elements 322 various support structures can be formed some of which can be triangular in shape. The triangular support structures can aid in the use of tablet device 1100. For example, one triangular support structure can be used to support tablet device 1100 in such a way that visual content can be presented at a desirable viewing angle of about 75° from horizontal. However, in order be able to appropriately fold segmented cover 300, segment 308 can be sized to be somewhat larger than segments 304, 306 and 310 (which are generally the same size). In this way, the segments can form a triangle having two equal sides and a longer third side, the triangle having an interior angle of about 75°.

Cover assembly 300 can pivotally attach to accessory attachment feature 202 by way of a hinge assembly. The hinge assembly can provide one or more pivots to allow the cover to fold over on the device while the cover assembly is attached to the device through the magnets. In the illustrated embodiment, the hinge assembly can include first hinge portion (also referred to as first end lug) 328 and a second hinge portion (or second end lug) 330 disposed opposite the first end lug. First end lug 328 can be rigidly connected to second end lug 330 by way of connecting rod 332 (shown in dotted line form) incorporated into a tube portion of segmented body 302. The longitudinal axis of connecting rod 332 can act as pivot line 1333 about which the segmented body can pivot relative to the hinge assembly. Connecting rod 332 can be formed of metal or plastic strong enough to rigidly support cover assembly 300 as well as any objects, such as tablet device 1100, magnetically attached to magnetic attachment feature 202.

In order to prevent metal on metal contact, first end lug 328 and second end lug 330 can each have protective layers 336 and 338, respectively, attached thereto. Protective layers (also referred to as bumpers) 336 and 338 can prevent direct contact between first end lug 328 and second end lug 330 with housing 102. This is particularly important when end lugs 328, 330 and housing 102 are formed of metal. The presence of bumpers 336 and 338 can prevent metal to metal contact between the end lugs and housing 102 thereby eliminating the chance of substantial wear and tear at the point of contact that can degrade the overall look and feel of tablet device 1100.

First end lug 328 and second end lug 330 can be magnetically connected to the electronic device by way of hinge span 340 that is configured to pivot with respect to the end lugs. The pivoting can be accomplished using hinge posts 342 (a portion of which can be exposed). Hinge posts 342 can rotatably secure hinge span 340 to both first end lug 328 and second end lug 330. Hinge span 304 can include magnetic elements. The magnetic elements can be arranged to magnetically attach hinge span 340 to a magnetic attachment feature having a matching arrangement of magnetic elements in the electronic device. In order to fix the magnetic elements in place within hinge span 340, hinge posts 342 can be used to secure magnetic elements located at both ends of hinge span 340 reducing the likelihood that the magnetic elements in hinge span 340 will move about having the potential for disrupting the magnetic attachment between hinge span 340 and the magnetic attachment feature in the electronic device.

Figure 5A:
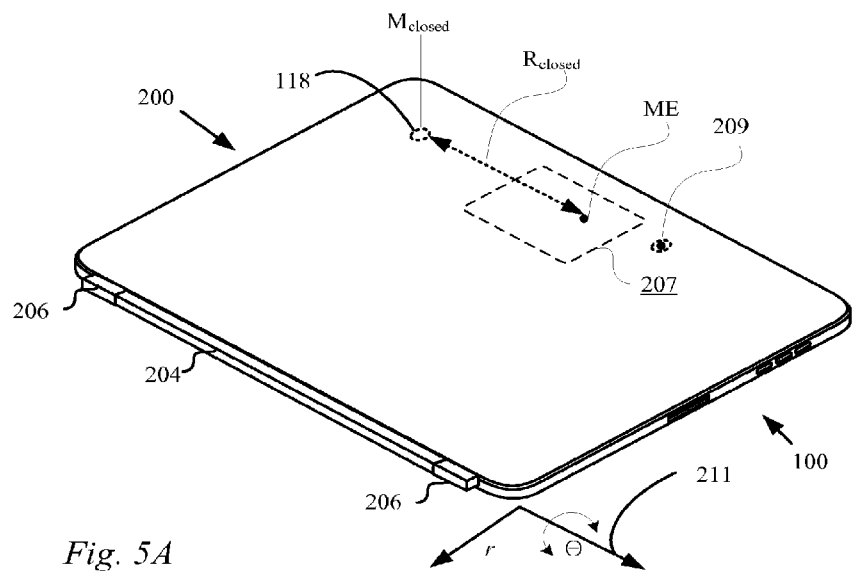
FIGS. 5A and 5B illustrate representative magnetic interaction between and onboard compass and magnetic elements in a flap as part of an accessory unit.
Figure 5B:
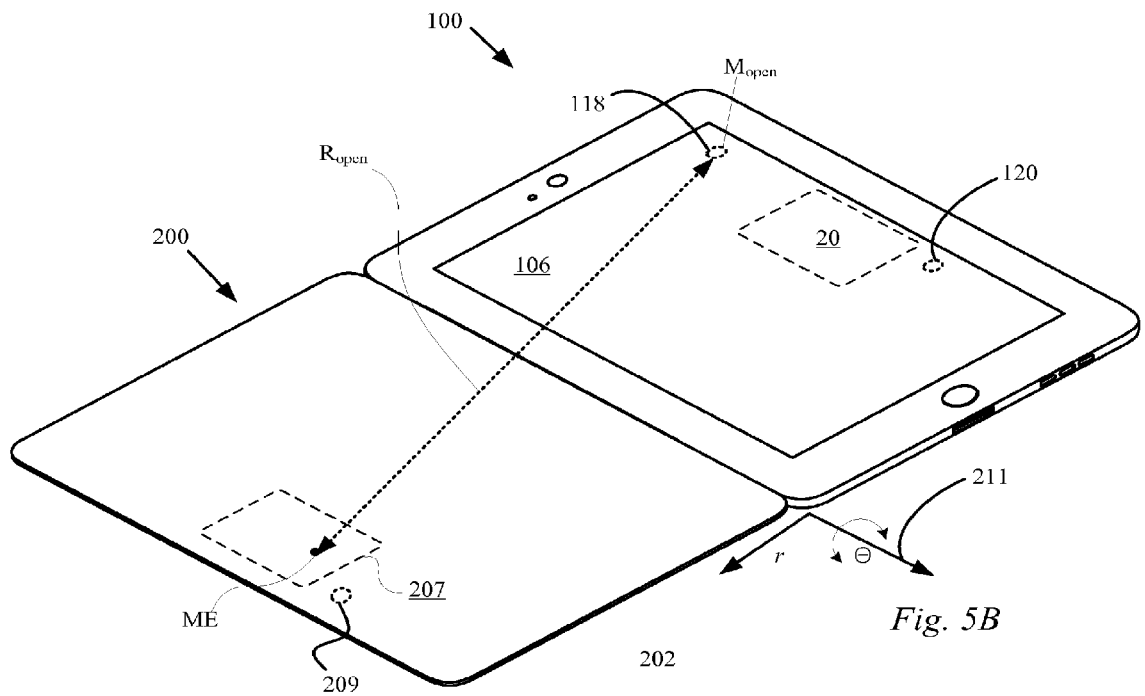

FIGS. 5A and 5B illustrate representative magnetic interaction between onboard compass 118 and magnetic elements 207 and 209 in flap 202. For the remainder of this discussion, for sake of clarity, magnetic elements 207 and 209 are presumed as a combined magnetic element ME located distance r from onboard compass 118. In the open configuration, distance r is a fixed distance $R_{open}$ whereas in the closed configuration distance r is a fixed distance $R_{closed}$. Accordingly, onboard compass 118 can detect magnetic flux density M emanating from combined magnetic element ME according to Eq. (1):

$$M(r) = B_{ME}/r^2 \qquad \text{Eq. (1)}$$

where:

$B_{ME}$ is magnetic flux density of combined magnetic element ME (Tesla); and r is distance between combined magnetic element ME and onboard compass 118.

Accordingly, in the open configuration, onboard compass 118 can detect a magnetic flux density according to Eq. (2):

$$M_{open} = B_{ME}/R_{open}^2 \qquad \text{Eq. (2).}$$

Whereas, in the closed configuration, onboard compass 118 can detect a magnetic flux density according to Eq. (3):

$$M_{closed} = B_{ME}/R_{closed}^2 \qquad \text{Eq. (3).}$$

However, since distance r between combined magnetic element ME and onboard compass 118 varies with pivot angle Θ, a change in magnetic flux density M detected by onboard compass 118 can provide an estimation of the movement of flap 202 about pivot line 211. In this way, by modeling the motion of flap 202 about pivot line 211, motion of flap 202 can be deduced by evaluating the change of the magnetic flux density M of combined magnetic element ME detected by compass 118 according to Eq. (4):

$$M(\Theta) = B_{ME}/r(\Theta)^2 \qquad \text{Eq. (4)}$$

where: $0 \leq \Theta \leq \pi$

Since tablet device 100 cannot detect the pivoting angle Θ directly, an indirect determination can be obtained using an accelerometer and gyroscope (not shown) included in tablet device 100. The accelerometer and gyroscope can provide a spatial orientation of tablet device 100 and onboard compass 118 can detect an overall magnetic flux density (including magnetic offsets shown in FIGS. 6A and 6B) that can be compared to the dynamic model to deduce if flap 202 is rotating about pivot line 211.

Figure 6A:
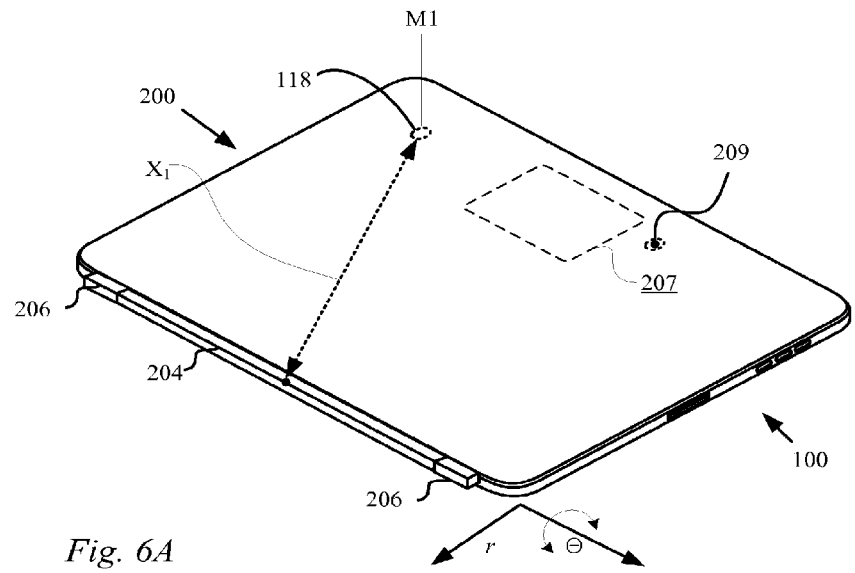
FIGS. 6A and 6B graphically illustrate various magnetic offsets that can be detected by onboard compass.
Figure 6B:
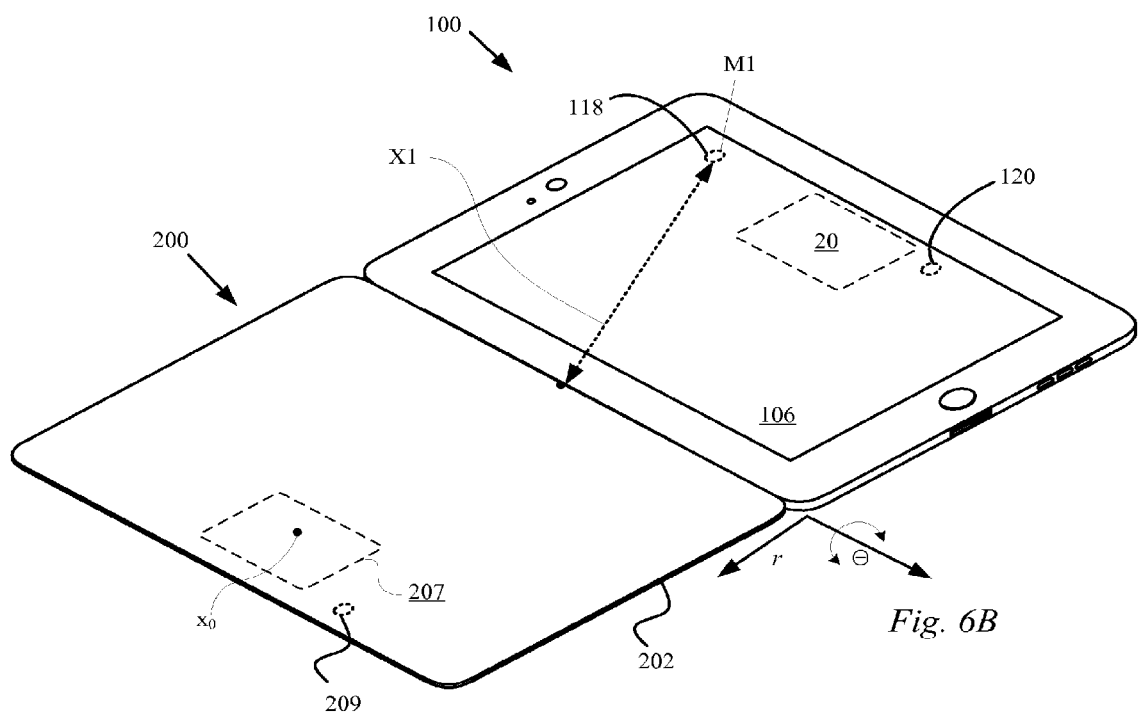

FIGS. 6A and 6B graphically illustrate various magnetic offsets that can be detected by onboard compass 118. For example, magnetic elements in magnetic attachment feature 204 can create magnetic offset M1. Magnetic offset M1 can provide an indication that protective cover 200 is magnetically attached to tablet device 100. For example, if onboard compass 118 detects a change in magnetic flux density along the lines of magnetic offset M1, then onboard compass 118 can provide a corresponding signal to a processor in tablet device 100. The processor can use the signal to deduce that protective cover 200 has been magnetically attached to tablet device 100.

Figure 7:
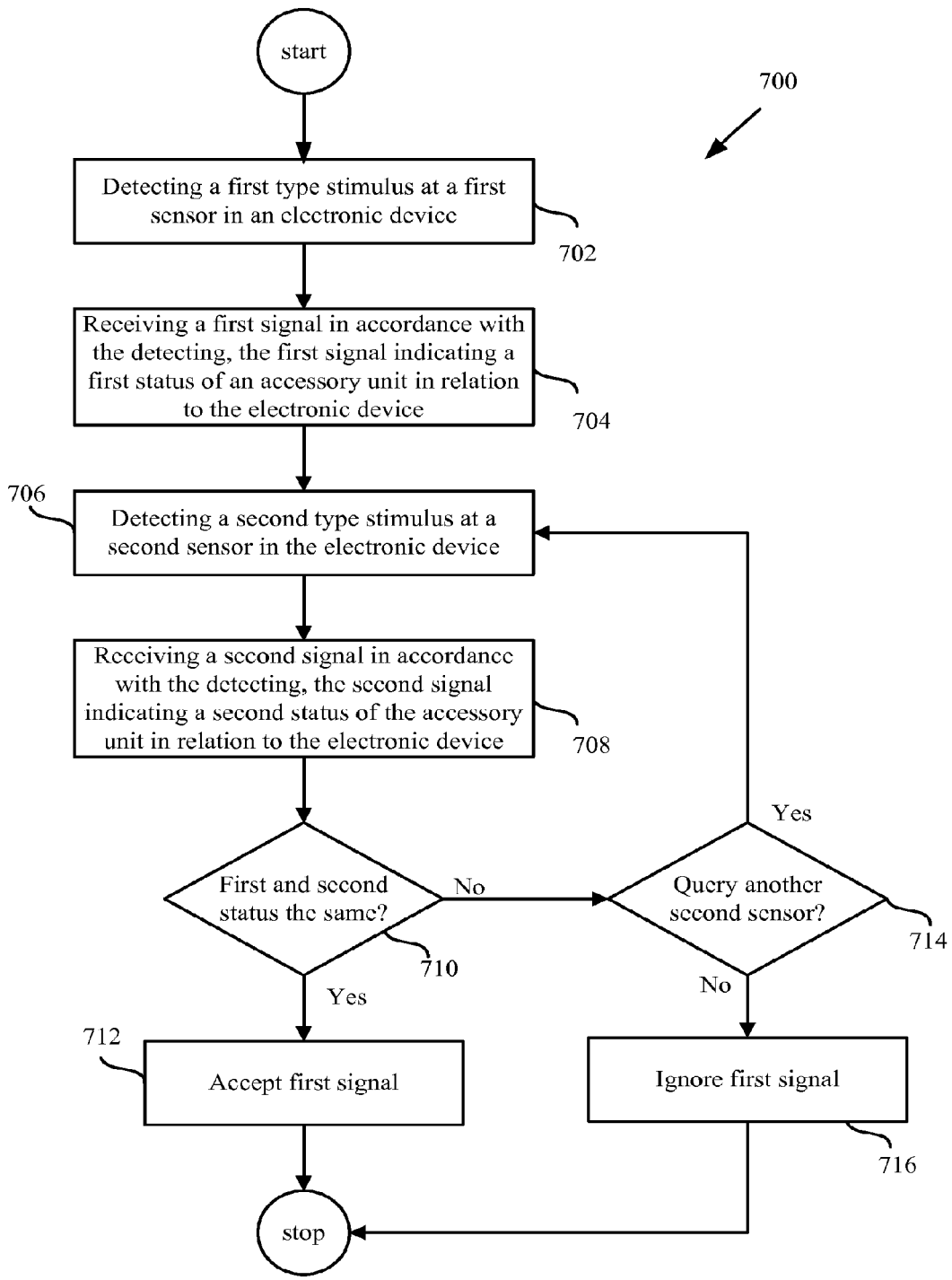
FIG. 7 shows a flowchart detailing process for confirming an indication from a Hall Effect sensor of the state of protective cover in relation to an electronic device.

FIG. 7 shows a flowchart detailing process 700 for confirming an indication from a Hall Effect sensor of the state of protective cover in relation to an electronic device. Process 700 can begin at 702 by detecting a first type stimulus at a first sensor in an electronic device. At 704, receiving a first signal in accordance with the detecting the first signal indicating a first status of an accessory device in relation to the electronic device. At 706, detecting a second type stimulus at a second sensor in the electronic device. At 708, receiving a second signal in accordance with the detecting, the second signal indicating a second status of the accessory device in relation to the electronic device. At 710, if the first and second status is the same, then the first signal is accepted at 712 and process 700 ends. Otherwise, at 714 a determination is made if a signal from another sensor is to be received. If it is determined that another signal from another sensor is to be received, than control is passed to 706, otherwise, the first signal is ignored at 716 and process 700 ends.

Figure 8:
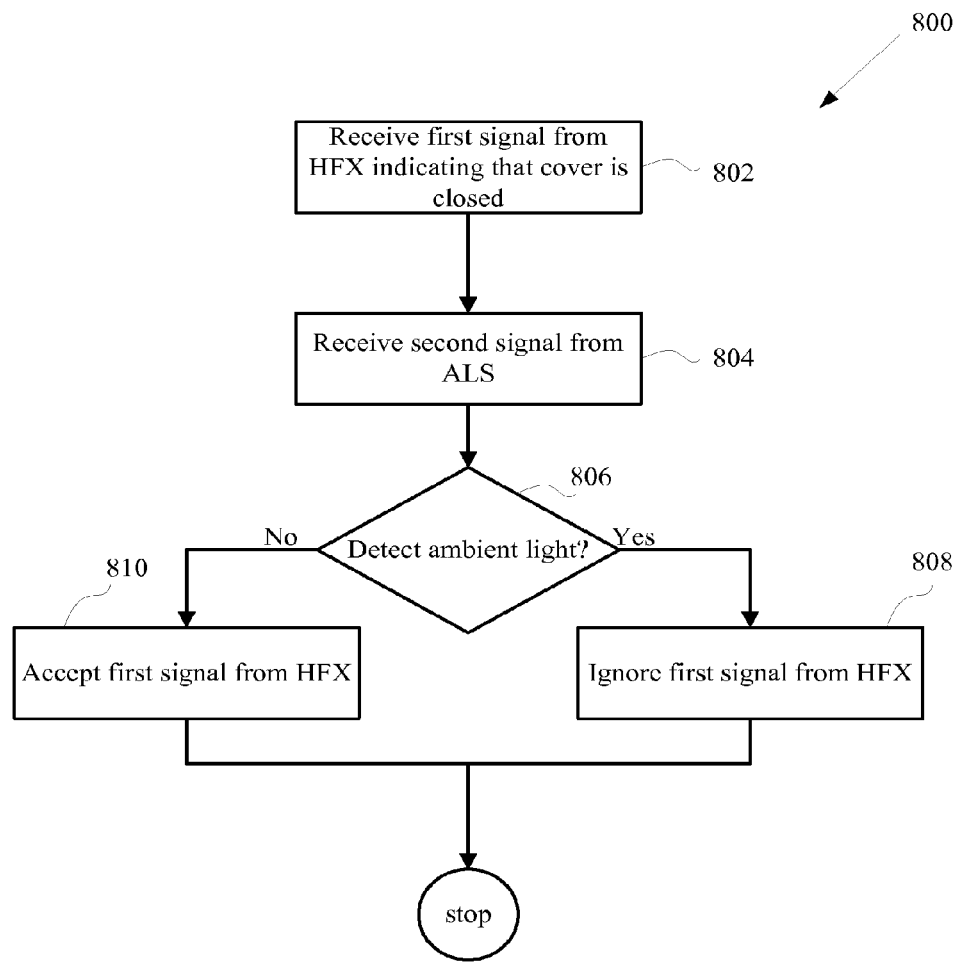
FIG. 8 shows a flowchart detailing process for using an ambient light sensor (ALS) in combination with a Hall Effect sensor to corroborate a state of a protective cover with regards to an electronic device.

FIG. 8 shows a flowchart detailing process 800 as one embodiment of step 702 of process 700 where the first sensor is a Hall Effect (HFX) sensor. More specifically, process 800 begins at 802 by receiving the indication from the HFX sensor that the state of the cover is closed. At 804, an ambient light sensor is activated. At 806, a determination is made if the ALS has detected an amount of ambient light greater than a threshold value of ambient light. If the amount of detected ambient light is greater than the threshold value, then the indication from the HFX sensor that the cover is closed is not corroborated and the indication from the HFX sensor that the cover is closed is ignored at 808, otherwise, the electronic device accepts the indication from the HFX sensor at 810.

Figure 9:
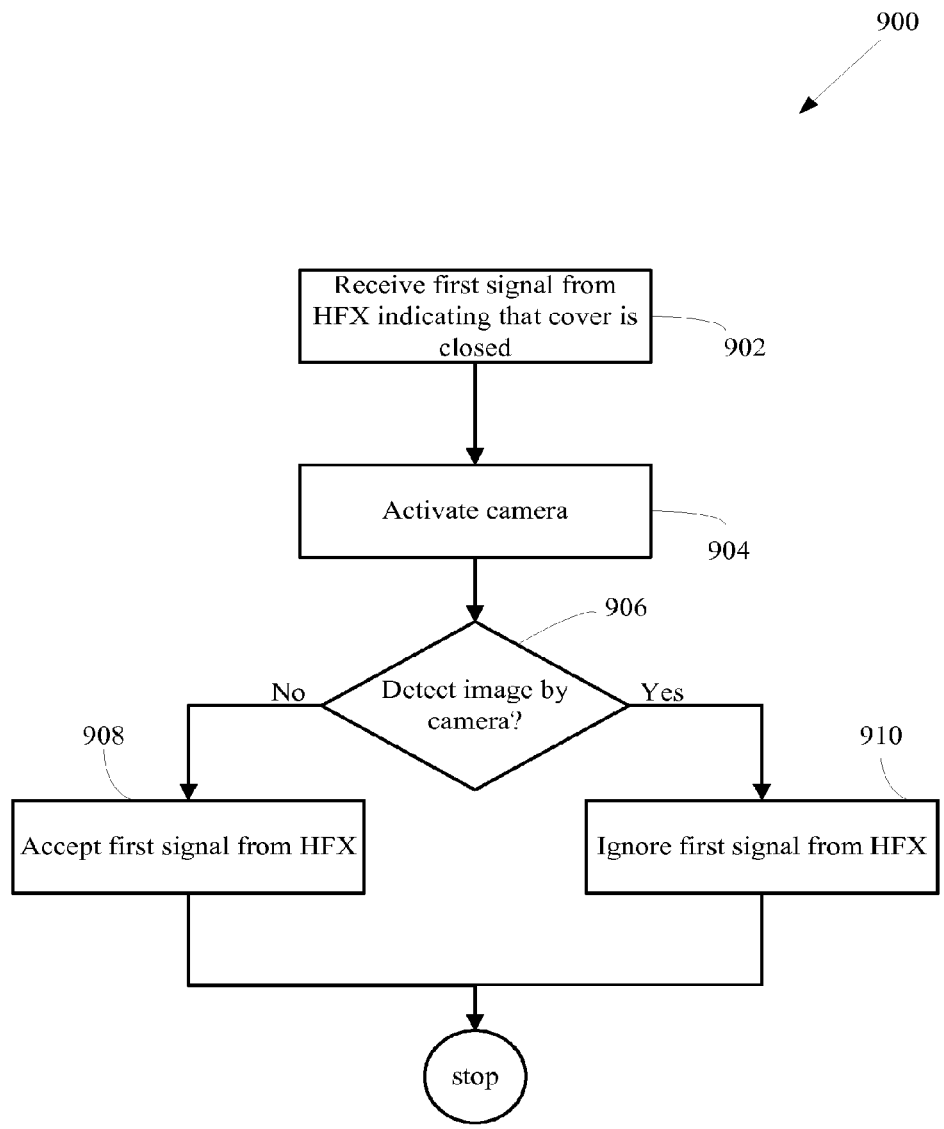
FIG. 9 shows a flowchart detailing process for using a camera in combination with a Hall Effect sensor to corroborate a state of a protective cover with regards to an electronic device.

FIG. 9 shows a flowchart detailing process 900 as one embodiment of step 702 of process 700 where the first sensor is a Hall Effect (HFX) sensor. More specifically, process 900 begins at 902 by receiving the indication from the HFX sensor that the state of the cover is closed. At 904, a camera is activated and at 906 a determination is made whether or not an image has been captured by the camera. If at 906 it is determined that the camera has not captured an image, then the indication from the HFX sensor that the cover is closed is accepted at 908. On the other hand, if at 906 it is determined that the camera has captured an image, then the indication from the HFX sensor that the cover state is closed is not corroborated and the indication from the HFX sensor is ignored by the electronic device at 910.

Figure 10:
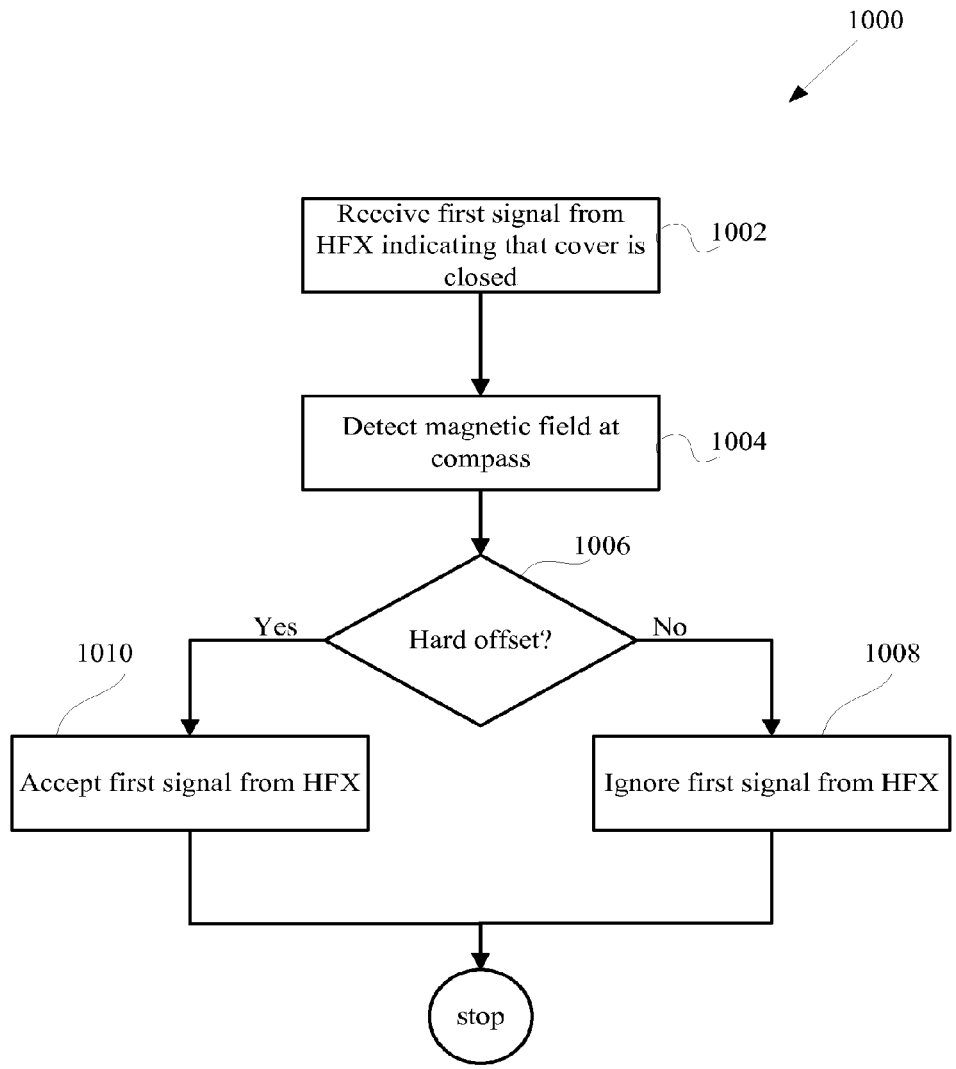
FIG. 10 shows a flowchart detailing process for using a magnetometer in the form of a compass in combination with a Hall Effect sensor to corroborate a state of a protective cover with regards to an electronic device.

FIG. 10 shows a flowchart detailing process 1000 as one embodiment of step 702 of process 700 where the first sensor is a Hall Effect (HFX) sensor. More specifically, process 1000 begins at 1002 by receiving the indication from the HFX sensor that the state of the cover is closed. At 1004, a magnetic field is detected at the compass and at 1006 a determination is made whether or not the detected magnetic field is consistent with a hard magnetic offset resulting from the presence of magnetic elements in the cover. If at 1006 it is determined that the there is no hard offset detected, then the indication from the HFX sensor that the cover is closed is not corroborated and the electronic device ignores the indication from the HFX sensor at 1008. On the other hand, if at 1006 it is determined that the hard offset is detected, then the indication from the HFX sensor that the cover state is closed is corroborated and the indication from the HFX sensor is accepted by the electronic device at 1010.

Figure 11:
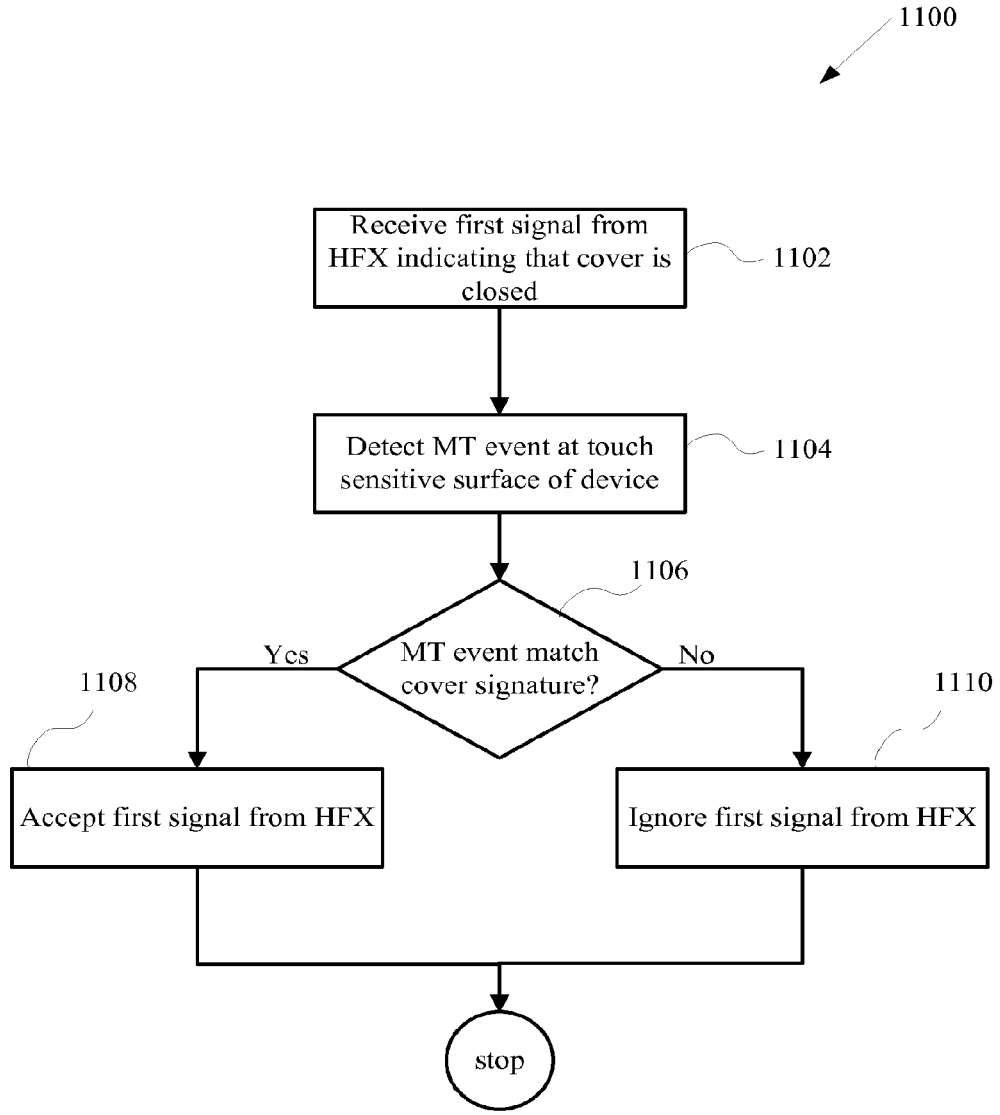
FIG. 11 shows a flowchart detailing process for using a multi-touch (MT) sensitive surface in combination with a Hall Effect sensor to corroborate a state of a protective cover with regards to an electronic device.

FIG. 11 shows a flowchart detailing process 1100 as one embodiment of step 702 of process 700 where the first sensor is a Hall Effect (HFX) sensor. More specifically, process 1100 begins at 1102 by receiving the indication from the HFX sensor that the state of the cover is closed. At 1104, a MT event is detected at a MT sensitive surface. At 1106, a determination is made if the MT event matches an MT signature consistent with the cover state being closed. If the MT signature is determined to be consistent with the cover state being closed, then at 1108, the electronic device accepts the indication from the HFX sensor. On the other hand, if the MT event does not match the MT signature, then the electronic device ignores the indication from the HFX sensor at 1110 and process 1100 ends.

Figure 12:
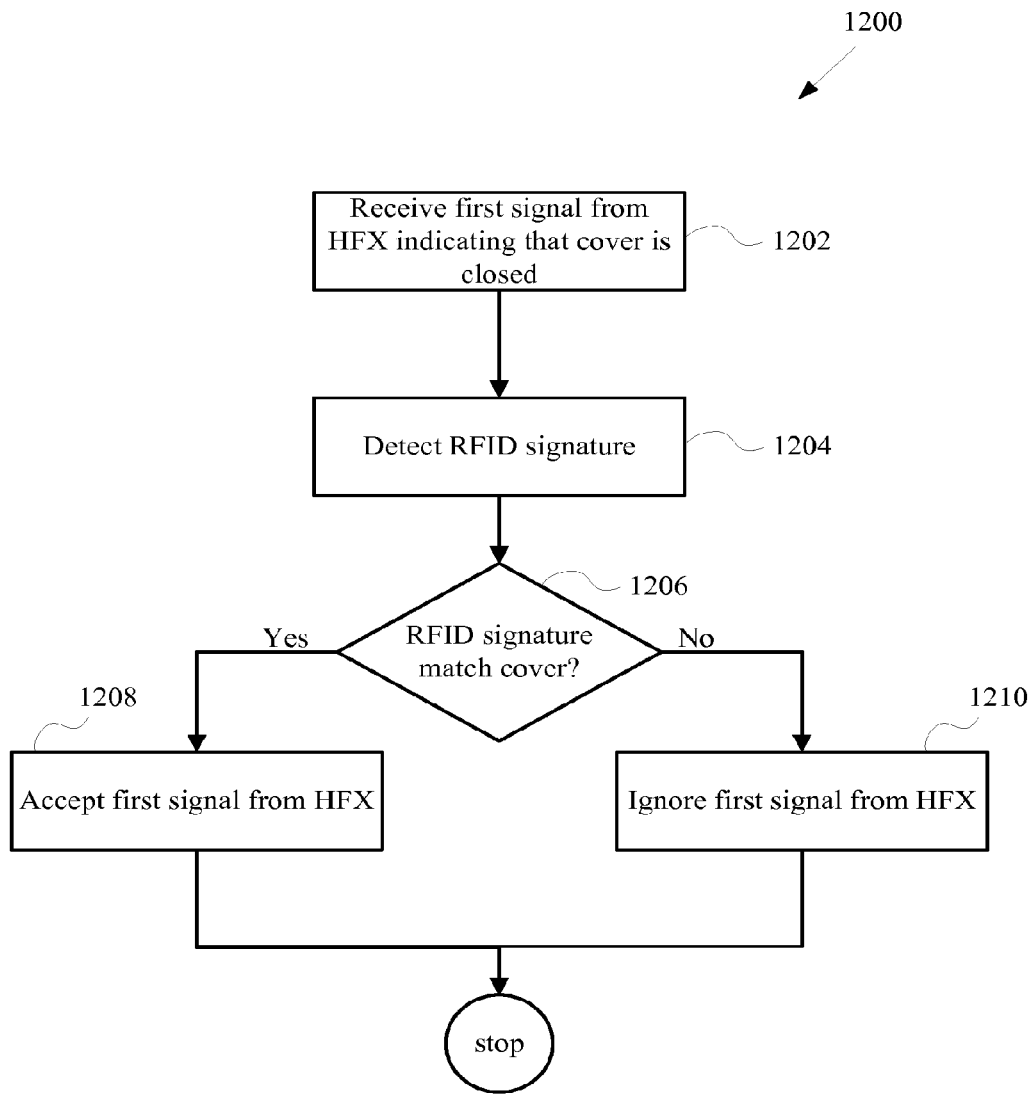
FIG. 12 shows a flowchart detailing process for using a RFID device in combination with a Hall Effect sensor to corroborate a state of a protective cover with regards to an electronic device.

FIG. 12 shows a flowchart detailing process 1200 as one embodiment of step 702 of process 700 where the first sensor is a Hall Effect (HFX) sensor. More specifically, process 1200 begins at 1202 by receiving the indication from the HFX sensor that the state of the cover is closed. At 1204, an RFID signature is detected. At 1206, a determination is made if the RFID signature matches an RFID signature consistent with the cover. If the RFID signature is determined to be consistent with the cover, then at 1208, the electronic device accepts the indication from the HFX sensor. On the other hand, if the RFID signature is not consistent with the cover, then the electronic device ignores the indication from the HFX sensor at 1210 and process 1200 ends.

Figure 13:
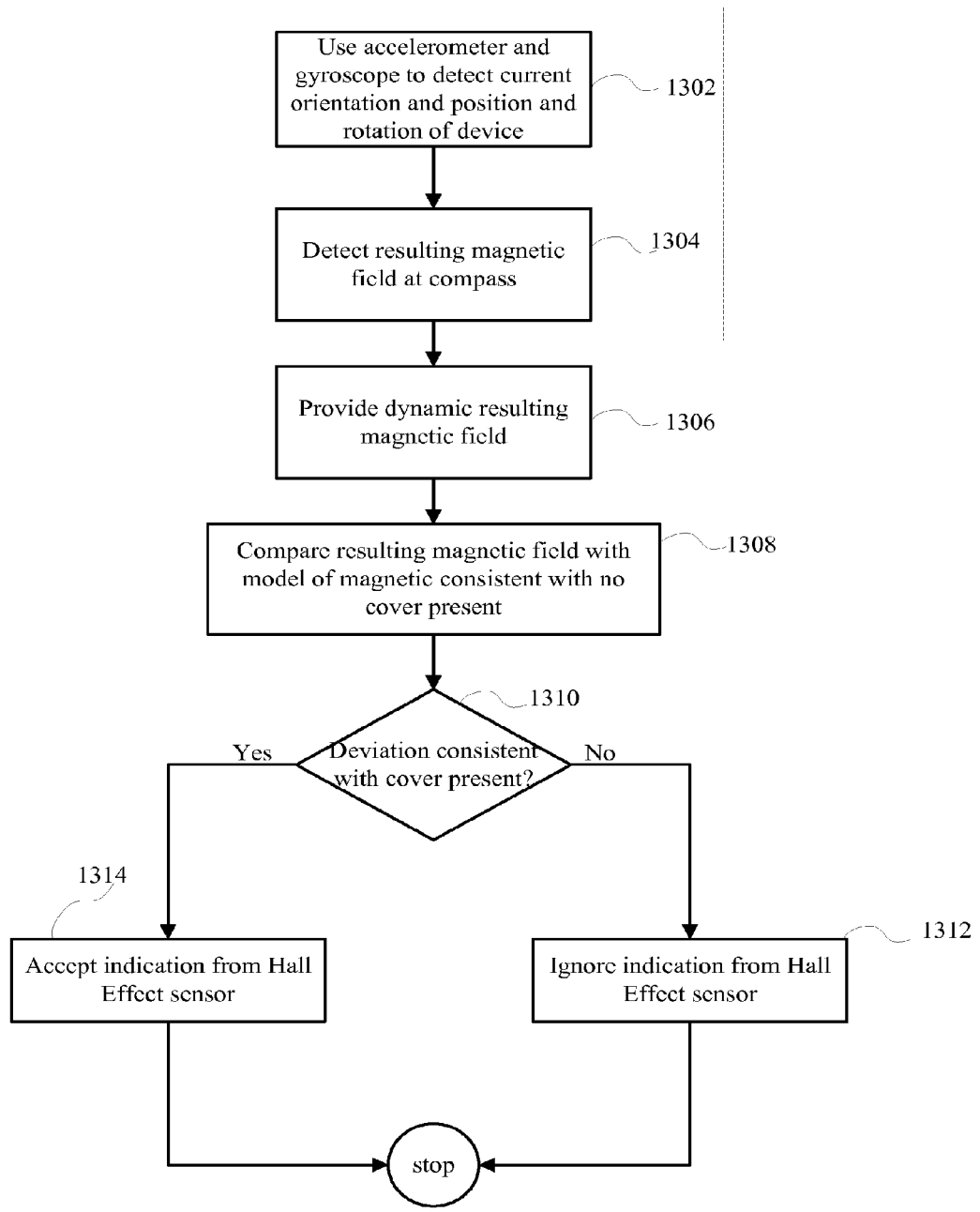
FIG. 13 shows a flowchart detailing process for determining a state of a protective cover in relation to an electronic device using a dynamic model of a magnetic field to corroborate a state of a protective cover with regards to an electronic device.

FIG. 13 shows a flowchart detailing process 1300. More specifically, process 1300 begins at 1302 using an accelerometer and gyroscope in real time to detect a current spatial position and rotation of the electronic device. At 1304, an extrinsic magnetic field is detected by a magnetometer (in the form of the compass). At 1306, a resulting dynamic magnetic field is provided in real time based upon the accelerometer and gyroscope readings and the compass readings, the resulting magnetic field being a net magnetic field of all extrinsic magnetic fields measured at the compass. The net magnetic field is updated in real time based upon the current spatial position and rotation of the electronic device to provide a dynamic resulting magnetic that is compared at 1308 to a reference datum of the dynamic magnetic field consistent with no cover present. At 1310, a deviation of the measured dynamic magnetic field and the reference datum is determined. If the deviation is less than a threshold deviation value, then the cover is not present and the electronic device ignores the indication from the HFX sensor at 1312. On the other hand, if the deviation is greater than the threshold deviation value, then the cover is present and the electronic device accepts the indication from the HFX sensor at 1314.

Figure 14:
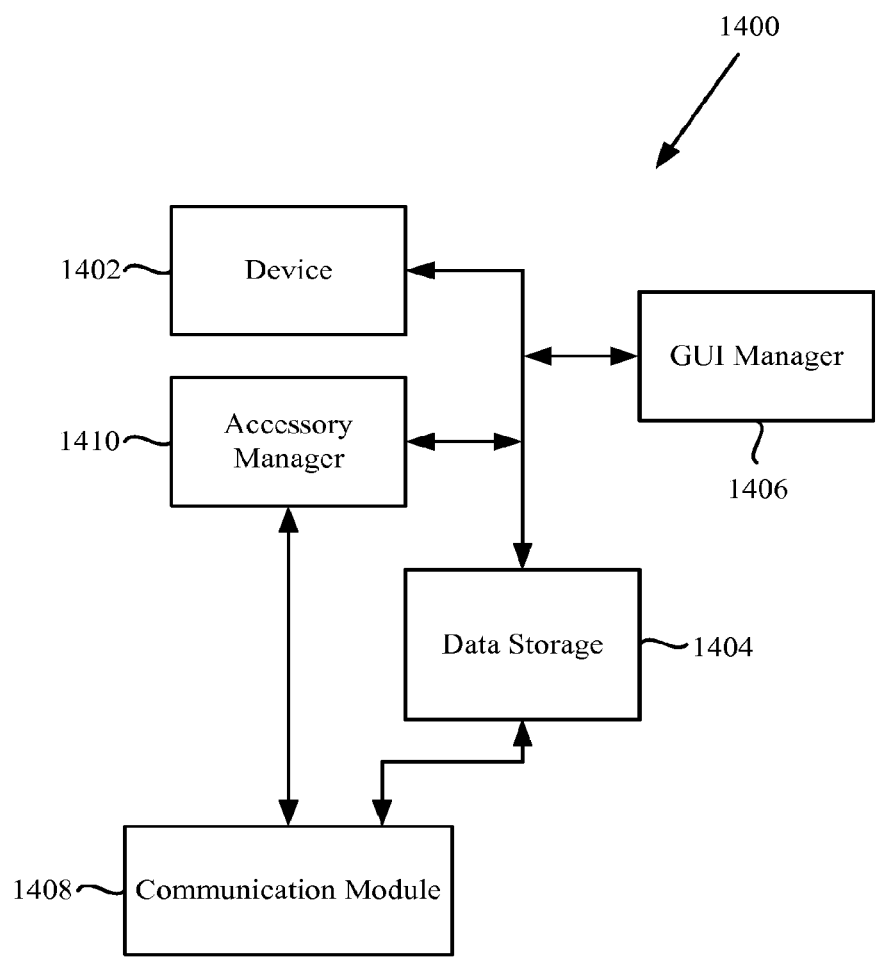
FIG. 14 is a block diagram of an arrangement of functional modules utilized by a portable media device.
Figure 15:
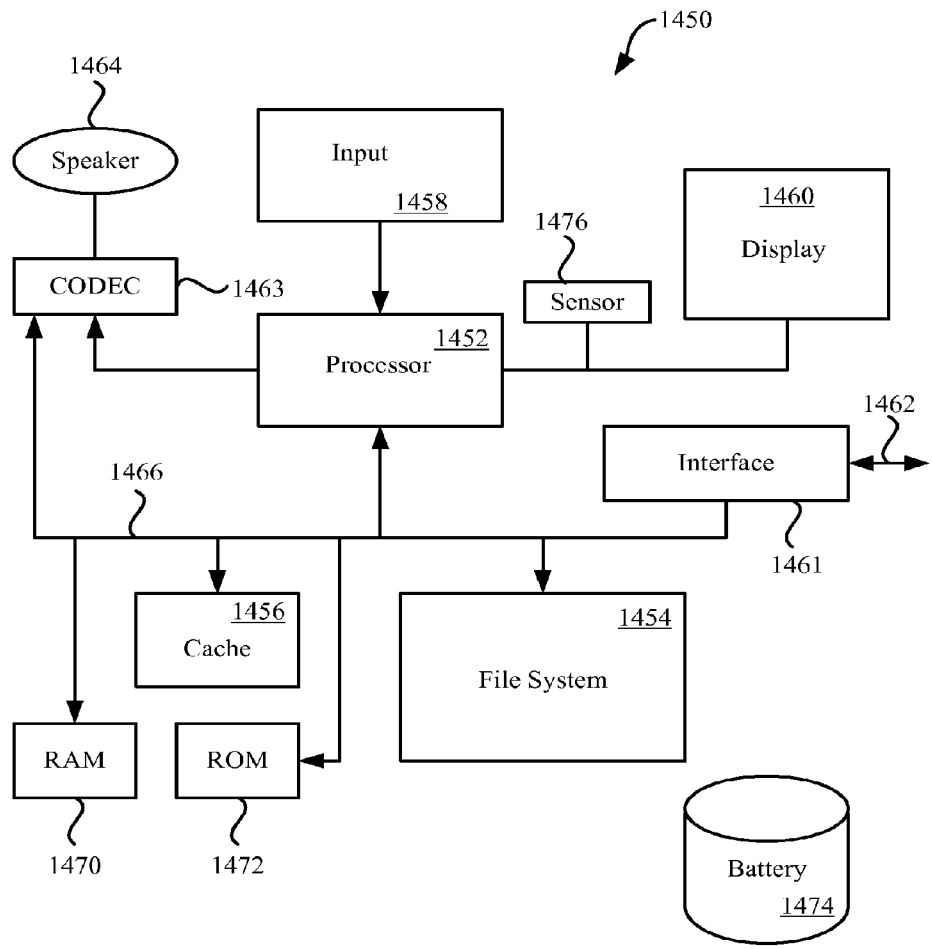
FIG. 15 is a block diagram of an electronic device suitable for use with the described embodiments.

FIG. 14 is a block diagram of an electronic device 1450 suitable for use with the described embodiments. The electronic device 1450 illustrates circuitry of a representative computing device. The electronic device 1450 includes a processor 1452 that pertains to a microprocessor or controller for controlling the overall operation of the electronic device 1450. The electronic device 1450 stores media data pertaining to media items in a file system 1454 and a cache 1456. The file system 1454 is, typically, a storage disk or a plurality of disks. The file system 1454 typically provides high capacity storage capability for the electronic device 1450. However, since the access time to the file system 1454 is relatively slow, the electronic device 1450 can also include a cache 1456. The cache 1456 is, for example, Random-Access Memory (RAM) provided by semiconductor memory. The relative access time to the cache 1456 is substantially shorter than for the file system 1454. However, the cache 1456 does not have the large storage capacity of the file system 1454. Further, the file system 1454, when active, consumes more power than does the cache 1456. The power consumption is often a concern when the electronic device 1450 is a portable media device that is powered by a battery 1474. The electronic device 1450 can also include a RAM 1470 and a Read-Only Memory (ROM) 1472. The ROM 1472 can store programs, utilities or processes to be executed in a non-volatile manner. The RAM 1470 provides volatile data storage, such as for the cache 1456.

The electronic device 1450 also includes a user input device 1458 that allows a user of the electronic device 1450 to interact with the electronic device 1450. For example, the user input device 1458 can take a variety of forms, such as a button, keypad, dial, touch screen, audio input interface, visual/image capture input interface, input in the form of sensor data, etc. Still further, the electronic device 1450 includes a display 1460 (screen display) that can be controlled by the processor 1452 to display information to the user. A data bus 1466 can facilitate data transfer between at least the file system 1454, the cache 1456, the processor 1452, and the CODEC 1463.

In one embodiment, the electronic device 1450 serves to store a plurality of media items (e.g., songs, podcasts, etc.) in the file system 1454. When a user desires to have the electronic device play a particular media item, a list of available media items is displayed on the display 1460. Then, using the user input device 1458, a user can select one of the available media items. The processor 1452, upon receiving a selection of a particular media item, supplies the media data (e.g., audio file) for the particular media item to a coder/decoder (CODEC) 1463. The CODEC 1463 then produces analog output signals for a speaker 1464. The speaker 1464 can be a speaker internal to the electronic device 1450 or external to the electronic device 1450. For example, headphones or earphones that connect to the electronic device 1450 would be considered an external speaker.

The electronic device 1450 also includes a network/bus interface 1461 that couples to a data link 1462. The data link 1462 allows the electronic device 1450 to couple to a host computer or to accessory devices. The data link 1462 can be provided over a wired connection or a wireless connection. In the case of a wireless connection, the network/bus interface 1461 can include a wireless transceiver. The media items (media assets) can pertain to one or more different types of media content. In one embodiment, the media items are audio tracks (e.g., songs, audio books, and podcasts). In another embodiment, the media items are images (e.g., photos). However, in other embodiments, the media items can be any combination of audio, graphical or visual content. Sensor 1476 can take the form of circuitry for detecting any number of stimuli. For example, sensor 1476 can include a Hall Effect sensor responsive to external magnetic field, an audio sensor, a light sensor such as a photometer, and so on.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a non-transitory computer readable medium. The computer readable medium is defined as any data storage device that can store data which can thereafter be read by a computer system. Examples of the computer readable medium include read-only memory, random-access memory, CD-ROMs, DVDs, magnetic tape, and optical data storage devices. The computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not target to be exhaustive or to limit the embodiments to the precise forms disclosed. It will be apparent to one of ordinary skill in the art that many modifications and variations are possible in view of the above teachings.

The advantages of the embodiments described are numerous. Different aspects, embodiments or implementations can yield one or more of the following advantages. Many features and advantages of the present embodiments are apparent from the written description and, thus, it is intended by the appended claims to cover all such features and advantages of the invention. Further, since numerous modifications and changes will readily occur to those skilled in the art, the embodiments should not be limited to the exact construction and operation as illustrated and described. Hence, all suitable modifications and equivalents can be resorted to as falling within the scope of the invention.

What is claimed is:

1. An electronic device, comprising:
   a housing comprising a front portion having an opening;
   a magnetometer disposed within the housing and configured to detect a magnetic offset between the magnetometer and an external magnetic element angularly disposed with respect to the magnetometer;
   an outer protective layer overlaying a display and disposed within the opening of the housing;
   a gyroscope and an accelerometer configured to cooperatively determine an orientation of the electronic device with respect to an inertial reference frame and to provide a magnetic offset correction factor in accordance with the determined orientation; and
   a processor disposed within the housing and configured to determine an angular position of the external magnetic element with respect to the magnetometer using the magnetic offset and the magnetic offset correction factor, wherein the processor is further configured to alter an operating state of the electronic device in accordance with the determined angular position of the external magnetic element.

2. The electronic device as recited in claim 1, wherein the external magnetic element is a permanent magnet.

3. The electronic device as recited in claim 1, wherein the external magnetic element is fixedly coupled to a portion of a flap that is pivotally coupled to the housing.

4. The electronic device as recited in claim 3, further comprising:
   a magnet disposed within the housing, the magnet configured to provide a magnetic field at the outer protective layer, the magnetic field having a polarity such that the external magnetic element of the flap is attracted to the magnet and secured against the protective layer, thereby securing the magnetic element to the outer protective layer.

5. The electronic device as recited in claim 4, wherein the magnet is disposed at a first end of the housing, the first end being opposite a second end, the second end being configured to pivotally couple the flap to the housing.

6. The electronic device as recited in claim 3, further comprising:
   an ambient light sensor (ALS) configured to verify a position of the flap when the flap blocks a substantial portion of light incident on the ALS.

7. The electronic device as recited in claim 3, wherein a first magnetic offset corresponds to the flap overlaying the outer protective layer, and wherein a second magnetic offset corresponds to the flap having an angular orientation 180 degrees different than the position corresponding to the first magnetic offset.

8. A portable electronic device having a touch sensitive display, the portable electronic device comprising:
   a housing;
   a magnetometer disposed within the housing and configured to determine a magnetic offset associated with an external magnetic field emitted by an external magnet, the external magnet being angularly disposed with respect to the housing;

an orientation sensor configured to determine an orientation of the housing with respect to an inertial reference frame and to provide a magnetic offset correction factor in accordance with the determined orientation; and a processor configured to determine an angular position of the external magnet with respect to the housing by using signals provided by the magnetometer and orientation sensor, the processor being further configured to alter an operating state of the portable electronic device in accordance with the determined angular position of the external magnet.

9. The portable electronic device as recited in claim 8, wherein the orientation sensor comprises a gyroscope.

10. The portable electronic device as recited in claim 9, wherein the orientation sensor further comprises an accelerometer.

11. The portable electronic device as recited in claim 8, further comprising an outer protective layer configured to provide a surface across which touch inputs can be received by the touch sensitive display.

12. The portable electronic device as recited in claim 11, wherein the magnetometer comprises a compass.

13. The portable electronic device as recited in claim 11, wherein the external magnet is coupled to a flap and wherein the flap is pivotally coupled to the housing.

14. The portable electronic device as recited in claim 13, further comprising:

a hall effect sensor configured to detect a magnetic field emitted from the flap when the flap overlays the outer protective layer.

15. A method performed by a processor disposed within a portable electronic device, the method comprising:

receiving a magnetic offset value from a magnetometer disposed within the electronic device when a magnetic field is detected;

determining when the magnetic field is emitted by an external magnetic element disposed proximate the portable electronic device;

receiving a magnetic offset correction value from an orientation sensor disposed within the portable electronic device that provides an orientation of the portable electronic device with respect to an inertial reference frame;

determining an angular position of the detected external magnetic element with respect to the portable electronic device using the magnetic offset value and the magnetic offset correction value; and changing an operating state of the portable electronic device in accordance with the determined angular position of the external magnetic element.

16. The method as recited in claim 15, further comprising:

confirming an angular position of the external magnetic element by activating a camera disposed within the portable electronic device, and receiving a signal from the camera.

17. The method as recited in claim 16, wherein when the position of the external magnetic element is not confirmed by the camera, ignoring the magnetic offset value provided y the magnetometer.

18. The method as recited in claim 15, wherein the orientation sensor comprises an accelerometer and a gyroscope.

19. The method as recited in claim 15, wherein the determining when the changing magnetic field corresponds to a magnetic field emitted by an external magnetic element disposed proximate the portable electronic device, comprises determining whether the changing magnetic field corresponds to one of a plurality of magnetic offsets.

20. The method as recited in claim 19, wherein the plurality of magnetic offsets comprises a first magnetic offset and a second magnetic offset.

* * * * *